US006627715B2

(12) United States Patent
Halasa et al.

(10) Patent No.: US 6,627,715 B2
(45) Date of Patent: Sep. 30, 2003

(54) GROUP IIA METAL CONTAINING CATALYST SYSTEM

(75) Inventors: Adel Farhan Halasa, Bath, OH (US); Wen-Liang Hsu, Cuyahoga Falls, OH (US); Chad Aaron Jasiunas, Copley, OH (US); John Robert Zuppo, III, Cuyahoga Falls, OH (US); Laurie Elizabeth Austin, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/124,006

(22) Filed: Apr. 17, 2002

(65) Prior Publication Data

US 2003/0153698 A1 Aug. 14, 2003

Related U.S. Application Data

(60) Provisional application No. 60/312,771, filed on Aug. 16, 2001.

(51) Int. Cl.$^7$ ................................ C08F 4/50; C08F 2/06
(52) U.S. Cl. ........................ 526/177; 526/176; 526/180; 526/187; 526/188; 526/189; 526/335; 526/340; 526/340.2
(58) Field of Search ................................ 526/177, 187, 526/180, 181, 335, 340, 340.2, 188, 189

(56) References Cited

U.S. PATENT DOCUMENTS

| | | | |
|---|---|---|---|
| 4,555,498 A | * 11/1985 | Kamienski | 502/153 |
| 4,996,273 A | 2/1991 | Van Der Huizen | 526/177 |
| 5,100,965 A | 3/1992 | Hsu et al. | 525/249 |
| 5,284,927 A | 2/1994 | Hsu et al. | 526/174 |
| 5,534,592 A | 7/1996 | Halasa et al. | 525/236 |
| 6,103,842 A | 8/2000 | Halasa et al. | 526/175 |
| 6,489,415 B2 * | 12/2002 | Hsu et al. | 526/177 |

* cited by examiner

*Primary Examiner*—Fred Teskin
(74) *Attorney, Agent, or Firm*—Alvin T. Rockhill

(57) ABSTRACT

The group IIa metal containing catalyst system of this invention can be utilized to synthesize rubbery polymers having a high trans microstructure by solution polymerization. Such rubbery polymers having a high trans microstructure content, such as polybutadiene rubber, styrene-isoprene-butadiene rubber, styrene-butadiene rubber, can be utilized in tire tread rubbers that exhibit improved wear and tear characteristics. This invention more specifically reveals a catalyst system which is comprised of (a) an organolithium compound, including organolithium functionalized compounds, (b) a group IIa metal salt selected from the group consisting of group IIa metal salts of di(alkylene glycol)alkylethers and group IIa metal salts of tri(alkylene glycol) alkylethers, and (c) an organoaluminum compound, and optionally an organomagnesium compound. The subject invention further discloses a process for synthesizing rubbery polymers having a high trans microstructure by a process that comprises polymerizing a conjugated diolefin monomer in an organic solvent in the presence of a catalyst system that is comprised of (a) an organolithium compound, (b) a group IIa metal salt selected from the group consisting of group IIa metal salts of amino glycols and group IIa metal salts of glycol ethers, and (c) an organoaluminum compound.

20 Claims, No Drawings

GROUP IIA METAL CONTAINING CATALYST SYSTEM

This application claims the benefit of provisional application Ser. No. 60/312,771 filed Aug. 16, 2001.

BACKGROUND OF THE INVENTION

It is highly desirable for tires to have good wet skid resistance, low rolling resistance, tear strength, and good wear characteristics. It has traditionally been very difficult to improve the wear characteristics of a tire without sacrificing wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

It is conventionally believed to be desirable for styrene-butadiene rubber that is utilized in tire tread compounds to have a high level of vinyl content (1,2-microstructure). It is also generally desirable for the repeat units which are derived from styrene to be randomly distributed throughout the polymer chains of the rubber. To achieve these objectives, styrene-butadiene rubbers are often synthesized by solution polymerization that is conducted in the presence of one or more modifying agents. Such modifying agents are well known in the art and are generally ethers, tertiary amines, chelating ethers or chelating amines. Tetrahydrofuran, tetramethylethylene diamine (TMEDA) and diethyl ether are some representative examples of modifying agents which are commonly utilized.

U.S. Pat. No. 5,284,927 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) a tripiperidino phosphine oxide, (b) an alkali metal alkoxide and (c) an organolithium compound.

U.S. Pat. No. 5,534,592 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.01:1 to about 20:1.

U.S. Pat. No. 5,100,965 discloses a process for synthesizing a high trans polymer which comprises adding (a) at least one organolithium initiator, (b) an organoaluminum compound, (c) a group IIa metal alkoxide and (d) a lithium alkoxide to a polymerization medium which is comprised of an organic solvent and at least one conjugated diene monomer.

U.S. Pat. No. 5,100,965 further discloses that high trans polymers can be utilized to improve the characteristics of tire tread rubber compounds. By utilizing high trans polymers in tire tread rubber compounds, tires having improved wear characteristics, tear resistance and low temperature performance can be made. Such high trans polymers include, trans-1,4-polybutadiene, trans styrene-isoprene-butadiene terpolymers, isoprene-butadiene copolymers and trans-styrene-butadiene copolymers.

U.S. Pat. No. 6,103,842 discloses a catalyst system for synthesizing a highly random styrene-butadiene rubber having a high trans content by solution polymerization. The styrene-butadiene rubber made by the process of U.S. Pat. No. 6,103,842 can be utilized in tire tread rubbers that exhibit improved wear characteristics. The catalyst system disclosed by U.S. Pat. No. 6,103,842 consists essentially of (a) an organolithium compound, (b) a group IIa metal alkoxide and (c) a lithium alkoxide. U.S. Pat. No. 6,103,842 further discloses a process for synthesizing a random styrene-butadiene rubber having a low vinyl content by a process which comprises copolymerizing styrene and 1,3-butadiene under isothermal conditions in an organic solvent in the presence of a catalyst system which consists essentially of (a) an organolithium compound, (b) a group IIa metal alkoxide and (c) a lithium alkoxide.

U.S. Pat. No. 4,996,273 discloses a highly active anionic polymerization catalyst containing an organolithium compound, a barium, strontium or calcium compound, and a trialkylaluminum compound containing at least 13 carbon atoms per molecule. These catalyst systems are reported to produce butadiene polymers having a high 1,4-trans-dienyl content.

SUMMARY OF THE INVENTION

This invention is based upon the unexpected discovery that a group IIa metal containing catalyst system that is comprised of a) an organolithium compound, (b) a group IIa metal salt selected from the group consisting of group IIa metal salts of amino alcohols and group IIa metal salts of glycol ethers, and (c) an organoaluminum compound, will catalyze the polymerization of conjugated diolefin monomers, such as 1,3-butadiene and isoprene, into rubbery polymers having a high trans microstructure content. The group IIa metal containing catalyst systems of this invention can also be used to copolymerize one or more conjugated diolefin monomers with vinyl aromatic monomers into copolymer rubbers, such as styrene-butadiene rubber. High trans-1,4-polybutadiene rubber and styrene-butadiene rubber that is synthesized using the catalyst system of this invention is highly useful in the preparation of tire tread rubber compounds which exhibit improved wear and tear characteristics, such as tread compounds that contain high levels of silica.

The subject invention more specifically discloses a catalyst system which is comprised of (a) an organolithium compound, (b) a group IIa metal salt selected from the group consisting of group IIa metal salts of amino glycols and group IIa metal salts of glycol ethers, and (c) an organometallic compound selected from the group consisting of organoaluminum compound that contain less than 13 carbon atoms and organomagnesium compounds.

The subject invention also reveals process for synthesizing rubbery polymers having a high trans microstructure by a process that comprises polymerizing a conjugated diolefin monomer in an organic solvent in the presence of a catalyst system that is comprised of (a) an organolithium compound, (b) a group IIa metal salt selected from the group consisting of group IIa metal salts of amino glycols and group IIa metal salts of glycol ethers, and (c) an organometallic compound selected from the group consisting of organoaluminum compounds and organomagnesium compounds.

The present invention further discloses a catalyst system that is comprised of (a) an organolithium compound, (b) a group IIa metal salt selected from the group consisting of group IIa metal salts of amino glycols and group IIa metal salts of glycol ethers, wherein the group IIa metal is selected from the group consisting of beryllium and magnesium, and (c) an organometallic compound selected from the group consisting of organoaluminum compounds and organomagnesium compounds.

The present invention also discloses a catalyst system that is comprised of (a) an organolithium compound, (b) a group IIa metal salt of an amino glycols, and (c) an organometallic compound selected from the group consisting of organoaluminum compounds and organomagnesium compounds.

The subject invention further discloses a catalyst system that is comprised of (a) an organolithium compound, (b) a group IIa metal salt selected from the group consisting of group IIa metal salts of amino glycols and group IIa metal salts of glycol ethers, wherein the group IIa metal is selected from the group consisting of beryllium and magnesium, and (c) an organometallic compound selected from the group consisting of organoaluminum compounds and organomagnesium compounds.

The present invention also reveals a catalyst system that is comprised of (a) an organolithium compound, (b) a group IIa metal salt of an amino glycol, and (c) an organometallic compound selected from the group consisting of organoaluminum compounds and organomagnesium compounds.

The subject invention further discloses catalyst system that is comprised of (a) an organolithium compound, (b) a group IIa metal of N,N-dialkyl amino alkylethoxy ethanol, and (c) an organoaluminum compounds.

The present invention further reveals a catalyst system that is comprised of (a) an organolithium compound, (b) a group IIa metal salt of member selected from the group consisting of tri(ethylene glycol) alkyl ethers and tetra (ethylene glycol) alkyl ethers, (c) an organoaluminum compound.

The subject invention also discloses a process for preparing a group IIa metal salt of an alkyl glycol ether that comprises reacting a group IIa metal hydroxide with the alkyl glycol ether at a temperature which is within the range of about 100° C. to about 200° C. in the presence of an aromatic organic solvent having a boiling point which is within the range of about 80° C. to about 280° C. For instance, barium hydroxide can be utilized as the group IIa metal hydroxide. The aromatic organic solvents that can be used include ethyl benzene and mesitylene. The reaction will preferable be conducted at a temperature that is within the range of about 120° C. to 180° C. and will most preferable be carried out at a temperature which is within the range of about 130° C. to 160° C.

DETAILED DESCRIPTION OF THE INVENTION

The polymerizations of the present invention will normally be carried out in a hydrocarbon solvent that can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The solution styrene-butadiene rubbers made utilizing the catalyst system and technique of this invention are comprised of repeat units that are derived from the conjugated diolefin monomers and optionally vinyl aromatic monomers, such as styrene. The styrene-butadiene rubbers made utilizing the catalyst system of this invention will typically contain from about 2 weight percent to about 50 weight percent styrene and from about 50 weight percent to about 98 weight percent 1,3-butadiene. However, in some cases, the amount of styrene included will be as low as about 1 weight percent. The styrene-butadiene rubber will more typically contain from about 3 weight percent to about 30 weight percent styrene and from about 70 weight percent to about 97 weight percent 1,3-butadiene. The styrene-butadiene rubber will preferably contain from about 3 weight percent to about 25 weight percent styrene and from about 75 weight percent to about 97 weight percent 1,3-butadiene.

Styrene-butadiene copolymer resins containing from about 50 weight percent to about 95 weight percent styrene and from about 5 weight percent to about 50 weight percent 1,3-butadiene can also be synthesized utilizing the catalyst systems of this invention. Such copolymers having glass transition temperatures within the range of 7° C. to 70° C. can be used as toner resins.

In the styrene-butadiene rubbers of this invention containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks-containing five or fewer repeat units. About 20% of the repeat units derived from styrene will be in blocks containing only one styrene repeat unit. Such blocks containing one styrene repeat unit are bound on both sides by repeat units which are derived from 1,3-butadiene.

In styrene-butadiene rubbers containing less than about 20 weight percent bound styrene which are made with the catalyst system of this invention, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units and over 90 percent of the repeat units derived from styrene will be in blocks containing 4 or fewer repeat units.

In styrene-butadiene rubbers containing less than about 10 weight percent bound styrene which are made with the catalyst system of this invention, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

The styrene-butadiene copolymers of this invention also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent. Additionally, the styrene-butadiene copolymers of this invention having bound styrene contents of up to at least about 42 percent are soluble in mixed hexane solvents.

The polymerizations of this invention are initiated by adding the group IIa metal containing catalyst system to a polymerization medium containing the monomers to be polymerized. Such polymerization can be carried out utilizing batch, semi-continuous or continuous techniques.

The organolithium compounds that can be employed in the process of this invention include the monofunctional and multifunctional initiator types known for polymerizing the conjugated diolefin monomers. The multifunctional organolithium initiators can be either specific organolithium compounds or can be multifunctional types which are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate the activity of the organolithium compound, thus necessitating the presence of sufficient lithium functionality so as to override such effects.

The multifunctional organolithium compounds which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and the like.

Exemplary multivinylsilane compounds include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3, 5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta or para isomer, and commercial divinylbenzene, which is a mixture of the three isomers, and other compounds such as the ethyl styrenes, also is quite satisfactory.

Other types of multifunctional lithium compounds can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithiun compound can be an alkylsilyloxy protected functional lithium compound as described in U.S. Provisional Application Serial No. 60/234,686. The teachings of U.S. Provisional Application Serial No. 60/234,686 are incorporated herein by reference. For instance, the initiator can be an alkylsilyloxy protected functional lithium initiator of the structural formula: (a):

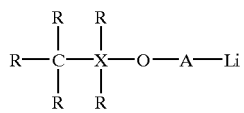

wherein X represents a group IVa element selected from the group consisting of carbon, germanium, and tin, wherein n represents an integer from 1 to 10, wherein R represents alkyl groups that can be the same or different, wherein the akyl groups contain from 1 to about 8 carbon atoms, and wherein A represents an akylene group; or (b):

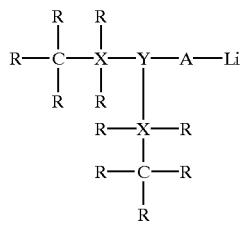

wherein X represents a group IVa element selected from the group consisting of carbon, germanium, and tin, wherein Y represents phosphorous or nitrogen, wherein n represents an integer from 1 to 10, wherein R represents alkyl groups that can be the same or different, wherein the alkyl groups contain from 1 to about 8 carbon atoms, and wherein A represents an alkylene group; or (c):

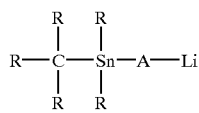

wherein R represents alkyl groups that can be the same or different, and wherein the alkyl groups contain from 1 to about 8 carbon atoms, and wherein A represents an alkylene group. The alkylene group can be straight chained or branched. For instance, A can represent a straight chained alkylene group of the structural formula —(CH2)n— or it can represent a branched alkylene group, such as:

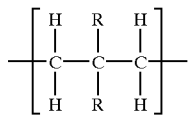

wherein R represents alkyl groups that can be the same or different, and wherein the alkyl groups contain from 1 to about 8 carbon atoms. R will typically represent an alkyl group containing from 1 to about 4 carbon atoms. It is preferred for R to represent methyl groups.

The alkylsilyloxy protected functional lithium initiator used in the practice of this invention will typically be of the structural formula:

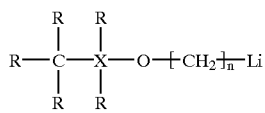

wherein X represents a group IVa element selected from the group consisting of carbon, silicon, germanium, and tin, wherein n represents an integer from 1 to 10, wherein R represents alkyl groups that can be the same or different, and wherein the alkyl groups contain from 1 to about 8 carbon atoms, or an alkylsilyloxy protected functional lithium compound of the structural formula:

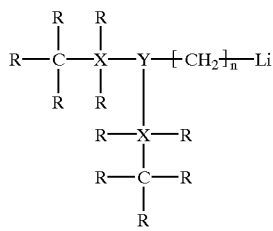

wherein X represents a group IVa element selected from the group consisting of carbon, silicon, germanium, and tin, wherein Y represents phosphorous or nitrogen, wherein n represents an integer from 1 to 10, wherein R represents alkyl groups that can be the same or different, and wherein the alkyl groups contain from 1 to about 8 carbon atoms. These rubbery polymers will accordingly normally contain a "living" lithium chain end.

It is normally preferred for the alkylsilyloxy protected functional lithium initiator to be of the structural formula:

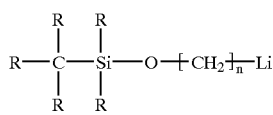

wherein n represents an integer from 1 to 10, wherein R represents alkyl groups that can be the same or different, and wherein the alkyl groups contain from 1 to about 8 carbon atoms.

The group IIa metal salts used in the catalyst systems of this invention are selected from the group consisting of group IIa metal salts of amino glycols and group IIa metal salts of glycol ethers. The group IIa metal salts of amino glycols that can be used are typically of the structural formula:

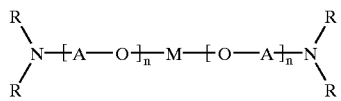

wherein the R groups can be the same or different and represent alkyl groups (including cycloalkyl groups), aryl groups, alkaryl groups or arylalkyl groups; wherein M represents a group IIa metal selected from the group consisting of beryllium, magnesium, calcium, strontium, and barium; wherein n represents an integer from 2 to about 10; and wherein A represents an alkylene group that contains from about 1 to about 6 carbon atoms. In cases where R represents an alkyl group, the alkyl group will typically contain from 1 to about 12 carbon atoms. In cases where R represents an aryl group, an alkaryl group, or arylalkyl group, the aryl group, alkaryl group, or arylalkyl group will typically contain from about 6 to about 12 carbon atoms. It is typically preferred for R to represent an alkyl group that contains from about 1 to about 8 carbon atoms or a cycloalkyl group that contains from about 4 to about 8 carbon atoms. It is normally more preferred for R to represent an alkyl group that contains from about 1 to about 4 carbon atoms. It is typically preferred for n to represent an integer from about 2 to about 4. It is typically preferred for A to represent an alkylene group that contains from 2 to about 4 carbon atoms with ethylene groups being the most preferred. It is preferred for M to represent strontium or barium with barium being the most preferred.

In cases where R represents cycloalkyl groups the group IIa metal salt will be of the structural formula:

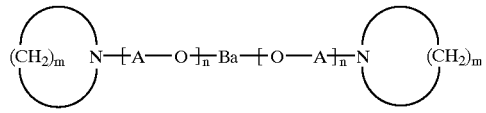

wherein m represents an integer from 4 to about 8; wherein n represents an integer from 2 to about 10; wherein M represents a group IIa metal selected from the group consisting of beryllium, magnesium, calcium, strontium, and barium; wherein A represents an alkylene group that contains from about 1 to about 6 carbon atoms, and wherein the A groups can be the same or different. It is normally preferred for m to represent an integer from 5 to about 7, for n to represent an integer from about 2 to about 4, and for A to represent an alkylene group that contains from 2 to about 4 carbon atoms. It is preferred for A to represent ethylene groups. It is preferred for M to represent strontium or barium with barium being the most preferred.

Some representative examples of barium salts where R represents cycloalkyl groups include:

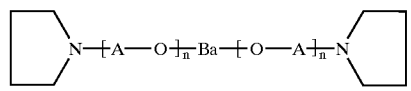

and

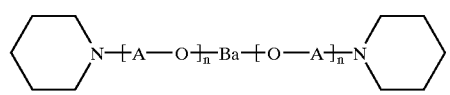

and

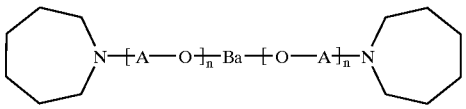

wherein A represents ethylene groups, wherein the A groups can be the same or different, and wherein n represents the integer 2.

The barium salt can also contain a cycloalkyl group that contains an oxygen atom. For instance the barium salt can be of the structural formula:

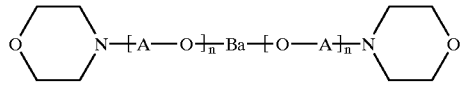

wherein A represents ethylene groups, wherein the A groups can be the same or different, and wherein n represents the integer 2.

The group IIa metal salt of glycol ethers that can be used are typically of the structural formula:

M—((O—(CH2)n)m—O—(CH2)x—CH3)2 wherein M represents a group IIa metal selected from the group consisting of beryllium, magnesium, calcium, strontium, and barium; wherein n represents an integer from 2 to 10; wherein m represents an integer from 1 to 6; and wherein x represents an integer from 1 to 12. In is preferred for n to represent an integer from 2 to about 4, for m to represent an integer from 2 to 8, and for x to represent an integer from 1 to 8. It is more preferred for n to represent an integer from 2 to 3, for m to represent an integer from 2 to 4, and for x to represent an integer from 1 to 4. It is preferred for M to represent strontium or barium with barium being the most preferred.

A highly preferred groups IIa metal salt is the barium salt of di(ethyleneglycol)ethyl ether which is of the structural formula:

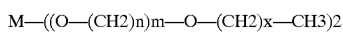

Another highly preferred group IIa metal salt is

Other highly preferred group IIa metal salts include barium salts of tri(ethyleneglycol)ethyl ethers and barium salts of tetra(ethyleneglycol)ethyl ethers.

The organoaluminum compounds that can be used in the catalyst systems of this invention are typically of the structural formula:

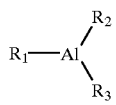

in which R1 is selected from the group consisting of alkyl groups (including cycloalkyl), aryl groups, alkaryl groups, arylalkyl groups and hydrogen; R2 and R3 being selected from the group consisting of alkyl groups (including cycloalkyl), aryl groups, alkaryl groups and arylalkyl groups. R1, R2, and R3 will typically represent alkyl groups that contain from 1 to 8 carbon atoms. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include tridodecylaluminum, tri-n-octylaluminum, tri-n-decylaluminum, triethyl aluminum (TEAL), tri-n-propyl aluminum, triisobutyl aluminum (TIBAL), trihexyl aluminum and diisobutyl aluminum hydride (DIBA-H).

The organoaluminum compound will preferably contain less than 13 carbon atoms. Such organoaluninum compounds include trimethylaluminum, triethylaluminum, tri-n-propylaluminum, tri-iso-propylaluminum, tri-isbutylaluminum, tri-t-butylaluminum, and tri-n-butylaluminum.

The molar ratio of the organoaluminum compound to the group IIa metal salt will typically be within the range of about 0.1:1 to about 20:1 and will preferably be within the range of 0.5:1 to 15:1. The molar ratio of the organoaluminum compound to the group IIa metal salt will more preferably be within the range of about 1:1 to about 8:1 and will most preferable be within the range of about 2:1 to about 6:1.

The molar ratio of the organolithium compound to the group IIa metal salt will typically be within the range of about 0.1:1 to about 20:1 and will preferably be within the range of 0.5:1 to 15:1. The molar ratio of the organolithium compound to the group IIa metal salt will more preferably be within the range of about 1:1 to about 6:1 and will most preferable be within the range of about 2:1 to about 4:1.

The organolithium compound will normally be present in the polymerization medium in an amount which is within the range of about 0.01 to 1 phm (parts by 100 parts by weight of monomer). In most cases, from 0.01 phm to 0.1 phm of the organolithium compound will be utilized with it being preferred to utilize from 0.025 phm to 0.07 phm of the organolithium compound in the polymerization medium.

The polymerization temperature utilized can vary over a broad temperature range of from about 20° C. to about 180° C. In most cases, a temperature within the range of about 40° C. to about 120° C. will be utilized. It is typically most preferred for the polymerization temperature to be within the range of about 70° C. to about 100° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like, or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides; multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta or para isomer. Commercial divinylbenzene which is a mixture of the three isomers and other compounds is quite satisfactory.

While any multiepoxide can be used, liquids are preferred since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing three or more aziridine rings per molecule. Examples of such compounds include the triaziridinyl phosphine oxides or sulfides such as tri(1-ariridinyl)phosphine oxide, tri(2-methyl-1-ariridinyl) phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the diesters and multiesters include diethyladipate, triethyl citrate, 1,3,5-tricarbethoxybenzene, diethyl phathalate, ethyl benzoate, and the like.

The preferred multihalides are silicon tetrahalides (such as silicon tetrachloride, silicon tetrabromide and silicon tetraiodide) and the trihalosilanes (such as trifluorosilane, trichlorosilane, trichloroethylsilane, tribromobenzylsilane and the like). Also preferred are the multihalogen-substituted hydrocarbons, such as 1,3,5-tri(bromomethyl) benzene, 2,4,6,9-tetrachloro-3,7-decadiene, and the like, in which the halogen is attached to a carbon atom which is alpha to an activating group such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead or germanium, also can be readily employed as coupling and branching agents. Difunctional counterparts of these agents also can be employed, whereby a linear polymer rather than a branched polymer results. Mixed coupling agents containing both silicon multihalides and tin multihalides can also be used.

Broadly, and exemplary, a range of about 0.01 to 4.5 milliequivalents of coupling agent are employed per 100 grams of monomer. It is preferred to utilize about 0.01 to about 1.5 milliequivalents of the coupling agent per 100 grams of monomer to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution (e.g., in cyclohexane) to the polymerization admixture in the final reactor with suitable mixing for distribution and reaction.

After the copolymerization has been completed, the styrene-butadiene elastomer can be recovered from the organic solvent. The styrene-butadiene rubber can be recovered from the organic solvent and residue by means such as decantation, filtration, centrification and the like. It is often desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the polymer is recovered from the solution, steam-stripping can be employed to reduce the level of volatile organic compounds in the rubber.

There are valuable benefits associated with utilizing the rubbery polymers made with the group IIa metal containing catalyst systems of this invention in tire tread compounds. For instance, styrene-butadiene rubber made with the group IIa metal catalyst system of this invention can be blended with natural rubber to make tread compounds for passenger tires which exhibit outstanding rolling resistance, traction, tear, and tread wear characteristics. In cases where tread wear is of great importance, high cis-1,4-polybutadiene can also be included in the blend. In any case, the styrene-butadiene rubbers of this invention can be used to improve the traction, tread wear and rolling resistance of tires made therewith.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

The group IIa metal-based catalyst of this invention can be used in the homopolymerization of 1,3-butadiene into polybutadiene (PBD), in the homopolymerization of isoprene into polyisoprene (PI), in the copolymerization of styrene and 1,3-butadiene into styrene-butadiene rubber (SBR) and in the terpolymerization of styrene, isoprene and 1,3-butadiene into styrene-isoprene-butadiene rubber (SIBR). The group IIa metal-based catalyst system of this invention can be prepared in-situ or can be preformed.

Example 1

Preparation of barium salt of di(ethylene glycol) ethylether (BaDEGEE) is described in this example. In the procedure used, a five-liter round bottle flask equipped with a stirrer and water condenser was charged with three liters of ethyl benzene having a boiling point of 136° C. Then 268.39 grams (2.00 moles) of di(ethyleneglycol)ethyl ether was added to the flask followed by the addition of 171.34 grams (one mole) of barium hydroxide. The mixture was then heated and refluxed until all the water had been removed by azeotroping with ethylbenzene (two moles or 36.00 ml). The clear tannic solution containing the barium salt of di(ethyleneglycol)ethyl ether, Ba—(O—$CH_2$—$CH_2$—O—$CH_2$—$CH_2$—O—$CH_2$—$CH_3$)$_2$. The solution was titrated with normal hydrochloric acid to determine its normality. This solution was used in making transpolybutadiene having a melting point of 10° C. to 40° C. and having a glass transition temperature (Tg) of −93° C.

Example 2

The barium salt of 2-(2-(dimethyl amino)ethoxyl) ethanol was prepared in this experiment. The procedure described in Example 1 was utilized except that 2-(2-(dimethyl amino) ethoxyl ethanol was used as the alcohol.

Example 3

The barium salt of di(ethyleneglycol) 2-ethylhexyl ether was prepared in this experiment. The procedure described in Example 1 was utilized except that di(ethylene glycol) 2-ethylhexyl ether was used as the alcohol.

Example 4

Barium salt of 2-(diisopropyl amino)ethanol was prepared in this experiment. The same procedure described in Example 1 was used in this experiment except that 2-(diisopropyl amino)ethanol was used as alcohol.

Example 5

In this experiment, 2200 g of a silica/alumina/molecular sieve dried premix containing 19.10 weight percent 1,3-butadiene was charged into a one-gallon (3.8 liters) reactor. Then, 7.2 ml of a 0.29M solution of the barium salt of di(ethylene glycol) ethylether (BaDEGEE) in ethylbenzene, 16.8 ml of a 1.0 M solution of tri-n-octylaluminum (TOA) in hexanes and 7.9 ml of 1.6 M solution of n-butyllithium (n-BuLi) in hexanes were added to the reactor. The molar ratio of BaDEGEE to TOA to n-BuLi was 1:4:3.

The polymerization was carried out at 900 C. for 1.5 hours. The GC analysis of the residual monomer contained in the polymerization mixture indicated that the monomer conversions at 60 and 90 minutes were 90% and 96%, respectively. One milliliter (ml) of neat ethanol was added to shortstop the polymerization. The polymer cement was then removed from the reactor and stabilized with 1 phm of antioxidant. After evaporating hexanes, the resulting polymer was dried in a vacuum oven at 500 C.

The polybutadiene produced was determined to have a glass transition temperature (Tg) at −90° C. and two melting temperatures (Tm) at 22° C. and 35.0° C. It was then determined to have a microstructure which contained 3.2 percent 1,2-polybutadiene units, 16.1 percent cis-1,4-polybutadiene units, and 80.3% trans-1,4-polybutadiene units. The Mooney viscosity (ML4) at 100° C. for this polymer was determined to be 37. The GPC measurements indicated that the polymer has a number average molecular weight (Mn) of 115,000 and a weight average molecular weight (Mw) of 145,000. The polydispersity (Mw/Mn) of the resulting polymer was 1.27.

Example 6

The procedure described in Example 5 was utilized in this example except that triethylaluminum (TEA) was used in place of TOA. The GC analysis of the residual monomer contained in the polymerization mixture indicated that the monomer conversions at 60 and 90 minutes were 86% and 92%, respectively. The resulting polymer has a glass transition temperature (Tg) at −91.0° C. and two melting points (Tm's) at 0° C. and 19.0° C. It was also determined to have a microstructure which contained 4.1% 1,2-polybutadiene units, 18% cis-1,4-polybutadiene units, and 77.9% tans-1,4-polybutadiene units. The Mooney viscosity (ML-4) was less than 10. The Mn and Mw of the resulting polymer were 88,000 and 108,000, respectively.

Example 7

The procedure described in Example 5 was utilized in this example except that triisobutylaluminum (TIBA) was used in place of TOA. The GC analysis of the residual monomer contained in the polymerization mixture indicated that the monomer conversions at 60 and 90 minutes were 94% and 96%, respectively. The resulting polymer has a Tg at −92° C. and two melting points at −20° C. and 20° C. It was also determined to have a microstructure that contained 5.5% 1,2-polybutadiene units, 20.8% cis-1,4-polybutadiene units, and 73.7% trans-1,4-polybutadiene units. The Mooney viscosity (M-4) was less than 10. The Mn and Mw of the resulting polymer were 65,000 and 89,000, respectively. The effects of aluminum alkyl on the polymers produced using the claimed catalyst systems are tabulated in Table 1.

Example 8

The procedure described in Example 5 was utilized in this example except that a preformed catalyst was used. The preformed catalyst was made by reacting BaDEGEE with TOA and followed by n-BuLi at the molar ratio of 1:4:3. The GC analysis of the residual monomer contained in the polymerization mixture indicated that the monomer conversions at 60 and 90 minutes were 89% and 96%, respectively. The resulting polymer had a glass transition temperature at −90° C. and two melting points at 21° C. and 37° C. It was also determined to have a microstructure that contained 3.2% 1,2-polybutadiene units, 14.5% cis-1,4-polybutadiene units, and 82.3% trans-1,4-polybutadiene units. The Mooney viscosity (ML4) was determined to be 68. The Mn and Mw of the resulting polymer were 132,000 and 182,000, respectively.

Example 9

The procedure described in Example 8 was utilized in this example except that the preformed catalyst was aged at 70° C. for 30 minutes before use. The molar ratio of BaDEGEE to TOA and to n-BuLi was 1:4:3. The GC analysis of the residual monomer contained in the polymerization mixture indicated that the monomer conversions at 60 and 90 minutes were 91% and 95%, respectively. The resulting polymer had a glass transition temperature at −90° C. and two melting points at 25° C. and 34° C. It was also determined to have a microstructure that contained 3.3% 1,2-polybutadiene units, 15.7% cis-1,4-polybutadiene units, and 81.0% trans-1,4-polybutadiene units. The Mooney viscosity (ML-4) was 86. The Mn and Mw of the resulting polymer were 151,000 and 214,000, respectively.

Examples 10–14

The procedure described in Example 9 was utilized in these examples except that the molar ratio of BaDEGEE to TOA and to n-BuLi was changed from 1:4:3 to 1:4:4, 1:3:3, 1:2:3, 1:3:4 and 1:8:8. The monomer conversions at 60 and 90 minutes, glass transition temperature (Tg), melting point (Tm), Mooney ML-4 viscosity (ML-4), number average molecular weight (Mn), weight average molecular weight (Mw) and trans-1,4-polybutadiene unit content of the resulting polymers are shown in Table 2.

TABLE 1

High Trans PBds Via BaDEGEE/R3 Al/n-BuLi Catalyst System

| Example No | Mode of add'n | Ba/Al/Li molar ratio | R3 Al | Rate (% conv) 60 min. | Rate (% conv) 90 min. | Tg (C.) | Tm (C.) | ML-4 | GPC Mn | GPC Mw | Mw/Mn | Trans (%) |
|---|---|---|---|---|---|---|---|---|---|---|---|---|
| 5 | In-Situ | 1/4/3 | TOA | 90% | 96% | −90 | 22, 35 | 37 | 115K | 145K | 1.27 | 80.3 |
| 6 | In-Situ | 1/4/3 | TEA | 86% | 92% | −91 | 0, 19 | <10 | 88K | 108K | 1.23 | 77.9 |
| 7 | In-Situ | 1/4/3 | TIBA | 94% | 96% | −92 | −20, 2 | <10 | 65K | 89K | 1.36 | 73.7 |

TABLE 2

High Trans PBds Via BaDEGEE/TOA/n-BuLi Catalyst System

| Example No | Mode of add'n | Ba/Al/Li molar ratio | Aging @ 70 C. | Rate (% conv) 60 min. | Rate (% conv) 90 min. | Tg (C.) | Tm (C.) | ML-4 | GPC Mn | GPC Mw | GPC Mw/Mn | Trans (%) |
|---|---|---|---|---|---|---|---|---|---|---|---|---|
| 5 | In-Situ | 1/4/3 | No | 90% | 96% | −90 | 22, 35 | 37 | 115K | 145K | 1.27 | 80.3 |
| 8 | Preformed | 1/4/3 | No | 89% | 96% | −90 | 21, 37 | 68 | 132K | 182K | 1.38 | 82.3 |
| 9 | Preformed | 1/4/3 | 30 min. | 91% | 95% | −90 | 25, 34 | 86 | 151K | 214K | 1.41 | 81.0 |
| 10 | Preformed | 1/4/4 | 30 min. | 90% | 95% | −89 | 25, 33 | 57 | 123K | 176K | 1.42 | 80.7 |
| 11 | Preformed | 1/3/3 | 30 min. | 87% | 93% | −90 | 24, 33 | 125 | 210K | 336K | 1.60 | 81.3 |
| 12 | Preformed | 1/2/3 | 30 min. | 64% | 81% | −89 | 25, 35 | 138 | 238K | 475K | 2.00 | 81.0 |
| 13 | Preformed | 1/3/4 | 30 min. | 85% | 93% | −90 | 0, 14 | 125 | 165K | 269K | 1.60 | 80.7 |
| 14 | Preformed | 1/8/8* | 30 min. | 96% | 98% | −89 | 25, 33 | <10 | 66K | 81K | 1.22 | 76.9 |

*(Ba)/100 g Bd = 0.3 mmol. for Example 11; 0.5 mmol. for all other runs

Comparative Example 15

The procedure described in Example 6 was utilized in this example except that barium nonylphenoxide (BaNP) was used in place of BaDEGEE. The GC analysis of the residual monomer contained in the polymerization mixture indicated that the monomer conversions at 60 and 90 minutes were 61% and 82%, respectively. The resulting polymer has a glass transition temperature at −91° C. and two melting points at −7° C. and 10° C. It was also determined to have a microstructure that contained 3.8% 1,2-polybutadiene units, 22.5% cis-1,4-polybutadiene units, and 73.7% trans1,4-polybutadiene units. The Mooney viscosity (ML4) was determined to be 14.

Comparative Example 16

The produce described in Example 5 was utilized in this example except that barium thymolate (BAT) was used instead of BaDEGEE. The resulting polymer has a glass transition temperature at −95° C. and a melting point of −14° C. It was also determined to have a microstructure that contained 6% 1,2-polybutadiene units, 22% cis-1, 4polybutadiene units, and 72% trans-1,4-polybutadiene units.

Comparative Example 17

In this experiment, 2000 g of a silica/alumina/molecular sieve dried premix containing 18.3 weight percent 1,3-butadiene was charged into a one-gallon (3.8 liters) reactor. Then, 6.6 ml of a 0.2 M solution of barium thymolate (BAT) in ethylbenzene, 3.4 ml of a 1.0 M solution of menthol in hexanes, 6.6 ml of 1.02 M solution of n-butyllithium (n-BuLi) in hexanes, and 6.2 ml of 0.87 M solution of triethylaluminum (TEA) were added to the reactor. The molar ratio of BAT to menthol to n-BuLi to TEA was 1:2.5:5:4.

The polymerization was carried out at 90° C. for 3 hours. The GC analysis of the residual monomer contained in the polymerization mixture indicated that 93% monomer had been consumed after the three hour period of time. The polymerization was continued for an additional 30 minutes and then, 2 milliliters (ml) of 1 M ethanol solution in hexanes was added to shortstop the polymerization and polymer was removed from the reactor and stabilized with 1 phm of antioxidant. After evaporating the hexanes solvent, the resulting polymer was dried in a vacuum oven at 50° C.

The polybutadiene produced was determined to have a glass transition temperature (Tg) at −91° C. and a melting temperature, Tm at 8.1° C. It was then determined to have a microstructure which contained 4 percent 1,2-polybutadiene units, 20 percent cis-1,4-polybutadiene units, and 76% trans-1,4-polybutadiene units. The Mooney viscosity (ML-4) at 100° C. for this polymer was determined to be 34.

Comparative Examples 18–20

The procedure described in Example 5 was utilized in these examples except that barium dodecylphenoxide (BaDP) was used in place of BaDEGEE. TEA and/or n-hexyl lithium was used instead of TOA and n-butyl lithium. Lithium 2-(2-ethoxyethoxy)ethoxide (ROLi) was also used. The molar ratio of BaDP to trialkyllithium to alkyllithium and to lithium 2-(2-ethoxy ethoxy)ethoxide was 1:4:3:2. The monomer conversions at 1, 1.5 and 4 hours are tabulated in Table 3. The Mooney viscosities, glass transition temperatures, melting points, and microstructures of the resulting high trans polybutadiene polymers are also shown in Table 3.

TABLE 3

High Trans PBds Via Ba(DP)2/R3 Al/RLi/ROLi Catalyst System

| Example No | Mode of add'n | R3 Al | RLi | Ba/Al/Li/ROLi molar ratio | Rate (% conv) 1 hr | Rate (% conv) 1.5 hr | Rate (% conv) 4 hr | Tg (C.) | Tm (C.) | ML-4 | Microstructure (%) trans-1, | Microstructure (%) cis-1,4- | Microstructure (%) 1,2- |
|---|---|---|---|---|---|---|---|---|---|---|---|---|---|
| 18 | In-Situ | TEA | n-butyl | 1/4/3/2 | 26% | 42% | 78% | −90 | 14 | 22 | 78.7 | 17.3 | 4.1 |
| 19 | In-Situ | TOA | n-hexyl | 1/4/3/2 | 30% | 42% | 80% | −90 | 21, 37 | 23 | 80.2 | 15.8 | 4.0 |
| 20 | In-Situ | TEA | n-hexyl | 1/4/3/2 | 38% | 51% | 87% | −90 | 25, 34 | 17 | 78.9 | 78.9 | 4.1 |

Comparative Examples 21–25

The procedure described in Example 5 was utilized in these examples except that barium dodecylphenoxide (BaDP) or barium 2-ethylhexoide (BaEH) was used in place of BaDEGEE. TEA and/or n-hexyl lithium was used instead of TOA and n-butyl lithium. 2-(2-ethoxyethoxy) ethanol (ROH) was also used. The molar ratio of Ba(OR)2 to trialkyllithium to alkyllithium and to 2-(2-ethoxy ethoxy) ethanol was 1:4:5:2. The monomer conversions at 60 and 90 minutes, the Mooney viscosities, glass transition temperatures, melting points, and microstructures of the resulting high trans polybutadienes are shown in Table 4.

continuous system at 90° C. The catalyst components, BaDEGEE, TOA and n-BuLi were added continuously, at a molar ratio of 1:4:3, to a heated mixer at 60–90° C. for 4–10 minutes before entering the fast reactor where a premix containing 20.1% 1,3-butadiene in hexanes was continuously added at a rate of 83.3 gams/minute. The amount of catalyst added was 1.0 mol of Ba per 100 grams of 1,3-

TABLE 4

High Trans PBds Via Preformed Ba(OR)2/R3 Al/RLi/ROH Catalyst System

| Example | Mode | | | | Ba/Al/Li/ROH | Rate (% conv) | | Tg | Tm | | Microstructure (%) | | |
|---|---|---|---|---|---|---|---|---|---|---|---|---|---|
| No | of add'n | Ba(OR)2 | R3 Al | RLi | molar ratio | 60 min. | 90 min. | (C.) | (C.) | ML-4 | trans-1,4 | cis-1,4 | 1,2- |
| 21 | Preformed | BaDP | TOA | n-hexyl | 1/4/5/2 | 82 | 92% | −91 | 26, 38 | 60 | 83.7 | 12.8 | 3.5 |
| 22 | Preformed | BaDP | TEA | n-butyl | 1/4/5/2 | 80 | 90% | −91 | 18, 36 | 24 | 80.5 | 15.8 | 3.7 |
| 23 | Preformed | BaDP | TOA | n-butyl | 1/4/5/2 | 82 | 91% | −90 | 25, 38 | 33 | 83.1 | 13.0 | 3.9 |
| 24 | Preformed | BaDP | TEA | n-hexyl | 1/4/5/2 | 80 | 89% | −89 | 20, 33 | 37 | 81.7 | 14.1 | 4.2 |
| 25 | Preformed | BaEH | TEA | n-butyl | 1/4/5/2 | 82 | 93% | −91 | 19 | 68 | 78.8 | 16.4 | 4.8 |

Example 26

The procedure described in Example 5 was utilized in this example except that a monomer mixture containing 20% styrene and 80% 1,3-butadiene in hexanes was used as the monomer instead of 1,3-butadiene. The GC analysis of the residual monomers contained in the polymerization mixture indicated that the monomer conversions at 60 and 120 minutes were 92%/48% and 98%/165%, respectively, for the 1,3-butadiene and styrene monomers. The polymerization was continued for a total of 5 hours. The polymer was recovered as described in Example 5 and was determined to have a glass transition temperature at −80° C. and a melting point at 10° C. It was also determined to have a microstructure that contained 3.62% 1,2-polybutadiene units, 13% cis-1,4-polybutadiene units, 67.9% trans-1,4-polybutadiene units, and 15.5% polystyrene units The trans-1,4-polybutadiene content was 80% based on polybutadiene repeat units alone.

Example 27

The procedure described in Example 18 was utilized in this example except that the styrene to 1,3-butadiene ratio was changed from 20:80 to 40:60. The GC analysis of the residual monomers contained in the polymerization mixture indicated that the monomer conversions at 60 and 139 minutes were 92%/55% and 98%/77, for the butadiene and styrene, respectively. The polymerization was continued for a total of 5 hours. The polymer was recovered as described in Example 5 and it was determined to have a glass transition temperature at −74° C. It was also determined to have a microstructure that contained 3.0% 1,2-polybutadiene units, 11% cis-1,4polybutadiene units, 52.32% trans-1,4-polybutadiene units, and 33.8% polystyrene units. The trans-1,4-polybutadiene content was 79%, based on polybutadiene repeat units alone.

Example 28

The high trans-1,4polybutadiene prepared in this experiment was synthesized in a two-reactor (one gallon each) continuous system at 90° C. The catalyst components, BaDEGEE, TOA and n-BuLi were added continuously, at a molar ratio of 1:4:3, to a heated mixer at 60–90° C. for 4–10 minutes before entering the fast reactor where a premix containing 20.1% 1,3-butadiene in hexanes was continuously added at a rate of 83.3 gams/minute. The amount of catalyst added was 1.0 mol of Ba per 100 grams of 1,3-butadiene. The total residence time was 1.5 hours (45 minutes for each reactor). A total monomer conversion was 85%. The resulting polymer was recovered as described in example 2. It was determined to have a glass transition temperature at −89° C. and two melting points at 25° C. and 37° C. It was also determined to have a microstructure that contained 3.0% 1,2-polybutadiene units, 15.9% cis-1,4-polybutadiene units, and 81.1% trans-1,4polybutadiene units. The polymer was also determined to have a Mooney viscosity (ML-4) at 35.

Examples 29–30

The high trans-1,4-polybutadiene prepared in this experiment was synthesized in a two-reactor (one gallon each) continuous system at 90° C. The procedure described in Example 28 was used except that amount of catalyst used was reduced to 0.70 and 0.5 mmol of Ba per 100 grams of 1,3-butadiene monomer. The monomer conversion at 90 minutes, polymer glass transition temperature, polymer melting point, polymer microstructure and polymer Mooney ML-4 viscosity are shown in Table 5.

Example 31

The procedure described in example 30 was utilized in this experiment except that 50 ppm (to 1,3-butadiene) of 1,2-butadiene was added to the premix as a molecular weight regulator. The resulting polymer was determined to have a glass transition temperature at −90° C. and melting points at 20° C. and 31° C. It was also determined to have a microstructure consisting of 78.2% trans-1,4-polybutadiene units, 16.4% cis-1,4-polybutadiene units, and 5.4% 1,2-polybutadiene units. The polymer had a Mooney ML4 viscosity of 60.

TABLE 5

High Trans PBd Prepared in the Continuous Reactor

| Example No | Ba/100 g Bd | Conversion (90 min.) | ML-4 | Tg (° C.) | Tm (° C.) | Microstructure (%) | | |
|---|---|---|---|---|---|---|---|---|
| | | | | | | Trans-1,4- | cis-1,4- | 1,2- |
| 28 | 1.0 mmol | 85% | 35 | −89 | 25, 39 | 81.1 | 15.9 | 3.0 |
| 29 | 0.7 | 85 | 84 | −89 | 25, 37 | 81.0 | 16.0 | 3.0 |
| 30 | 0.5 | 81 | 126 | −90 | 26, 40 | 81.5 | 15.6 | 2.9 |
| 31 | 0.5 | 82 | 60 | −90 | 20, 31 | 78.2 | 16.4 | 5.4 |

Example 32

A pyrrolidine functionalized high trans-1,4-polybutadiene was prepared in this experiment. The procedure described in Example 5 was utilized except that 1:1:4:3 molar ratio of Ba(DEGEE) to pyrrolidine to trioctylaluminum and to n-BuLi was used as the catalyst. The Ba(DEGEE) was the first catalyst component added to the reactor containing the 1,3-butadiene premix. Then, the TOA was added followed by the pyrrolidine, and finally by the n-butyllithium. The polymerization was conducted at 90° C. for 2 hours and the GC analysis of the residual monomer indicated that 90% monomer conversion was obtained. The polymerization was continued for another 30 minutes and then the resulting polymer was recovered as described in Example 5. The polymer was determined to have a glass transition temperature at −90° C. and melting points at 23° C. and 32° C. The Mooney ML,4 viscosity at 100° C. of the polymer was also determined to be 94. It w as determined by high pressure liquid chromatography (HPLC) that the polymer contained 68% pyrrolidine functionality.

Example 33

A pyrrolidine functionalized high trans-1,4-polybutadiene was prepared in this experiment. The procedure described in Example 5 was utilized except that 3-pyrrolidino-1-propyllithium which was chain extended with isoprene (AI-210 CE prepared by FMC Corporation) was used as the initiator instead of n-BuLi. The polymerization was conducted at 90° C. for 1.5 hours and the GC analysis of the residual monomer indicated that 90% monomer conversion was obtained The polymerization was continued for another 30 minutes and then the resulting polymer was recovered as described in Example 5. The polymer was determined to have a glass transition temperature at −90° C. and a melting point a 60° C. The ML-4 at 100° C. of this polymer was also determined to be 60. It was determined by high pressure liquid chromatography (HPLC) that the polymer contained 10% to 30% pyrrolidine functionality.

Example 34

These experiments were conducted using two five liter jacketed reactors in series, followed by a cement mixer for coupling agent addition, and a cement tank for sample collection. Each reactor was equipped with three 3-inch (7.6 cm) diameter axial flow turbines (AFT's) and were equipped with baffles. Agitation in the reactors was set at 75% motor speed, which equates closely to 450 rpm. Residence time was set at 0.645 hours in the first reactor, 0.084 hours in the piping between the reactors, 0.655 hours in the second reactor, and 0.117 hours in the piping to the cement mixer (a total of 1.50 hours). The cement mixer hold time was set at 0.096 hours. The first reactors internal temperature was controlled at 200° F. (93° C.) and the second reactors internal temperature was controlled at 195° F. (90° C.).

Up to six material streams were metered and pressure fed into the system. The material entry system into the first reactor consisted of an inner dipleg constructed out of ⅛" (0.32 cm) SS tubing inside of an outer dipleg constructed out of 0.25" (0.64 cm) SS tubing. The tubing for each of the two diplegs pass through a separate temperature controlled heat exchanger prior to entering the reactor. The coupling agent was fed into the bottom of the cement mixer with the cement coming from the second reactor.

In this example, premix (monomer in solvent) feed of 20.329% 1,3-butadiene in hexane, containing 50 parts 1,2-butadiene per million parts 1,3-butadiene, was metered at 4956.4 grams per hour through a heat exchanger at 200° F. (93° C.) and into the first reactor through the outer dipleg.

A 10.00% solution of BaDEGEE (barium salt of di(ethyleneglycol) ethylether) in hexane with a flow rate of 19.66 grams per hour was added to a 25.0% TOA (trioctylaluminum) in hexane with a flow rate of 29.13 grams per hour, and this mixture was added to a 3.960% n-BuLi (n-butyllithium) in hexane with a flow rate of 24.10 grams per hour. This solution was passed through a heat exchanger at 200° F. (93° C.) and then entered the first reactor through the inner dipleg. This gave a feed rate of 0.5 millimoles of barium per 100 grams of monomer, 4 moles of TOA per mole of barium, and 3 moles n-BuLi per mole of barium.

This experiment was started with the reactors full of dry hexane. The material flowed from the first reactor to the second reactor, through the cement mixer, and into the cement holding tank. The experiment was allowed to proceed for 4.5 hours to allow for three complete turnovers in the system and to achieve a steady state in the system. The system was determined to be at steady state when the temperature profile in the reactors and the reactor monomer to polymer conversions maintained constant values.

After achieving steady state the cement tank was emptied and the polymer was collected for the next two hours. One-half hour after cement collection began, 46.8 grams of 10% by weight of TMEDA (tetramethylethylenediamine) in hexane (4.0 moles of TMEDA per mole of barium to stop the reaction) and 201.5 grams of 10% by weight of antioxidant in hexane was added to the cement tank protect the polymer.

The cement (polymer dissolved in hexane) was emptied from the cement tank into a five gallon (18.9 liter) bucket. The cement was then poured into polyethylene film lined trays and was dried in an air oven at 130° F. (54° C.) until all of the solvent was evaporated.

The polymer recovered was then analyzed by DSC, NMR, GPC, and Mooney Large testing. The results of this testing showed a 67 Mooney Large, onset Tg of −91° C., inflection Tg of −86° C., end Tg of 81.1° C., melt temperature of 21° C., 1,2-polybutadiene content of 4.5% cis-1,4-polybutadiene content of 15.7%, trans-1,4-polybutadiene content of 79.8%, Mn of 138,500, Mw of 247,200, Mz of 531,980, and a Mw/Mn of 1.78. Further testing was done and is summarized in the following table.

| 1,2PBd | 1,4-PBd | cis-1,4-PBd | trans-1,4-PBd | Tg | Tm | Mn | Mw | Mooney |
|---|---|---|---|---|---|---|---|---|
| 3.4 | 96.7 | 13.2 | 83.5 | −93.2 | 38.7 | 229,700 | 398,800 | 126 |
| 3.6 | 96.4 | 13.7 | 82.7 | −90.4 | 35.7 | 112,200 | 176,500 | 35 |
| 3.9 | 96.1 | 14.8 | 13.7 | −88.2 | 35.8 | 112,800 | 179,600 | 16 |
| 3.7 | 96.3 | 14.5 | 81.8 | −89.7 | 35.3 | 656,500 | 128,100 | 18 |
| 4.5 | 95.5 | 15.4 | 80.1 | −89.5 | 22.2 | 218,000 | 344,000 | 72 |
| 4.4 | 95.6 | 15.8 | 79.8 | −90.8 | 21.5 | 167,800 | 307,700 | 72 |
| 4.5 | 95.5 | 15.5 | 80.0 | −90.7 | 18.4 | 138,800 | 295,200 | 64 |
| 4.4 | 95.6 | 15.9 | 79.7 | −90.8 | 24.4 | 167,900 | 289,100 | 66 |

Example 35

The procedure described in Example 34 was utilized in this experiment except that there were two premix streams employed to give 10 parts of styrene and 90 parts 1,3-butadiene. A stream of 18.565% 1,3-butadiene in hexane, containing 50 parts 1,2-butadiene per million parts 1,3-butadiene, metered at 4501.7 grams per hour was added to a stream of 20.211% styrene in hexane metered at a rate of 459.5 grams per hour. The combined streams were then fed through a heat exchanger at 200° F. (93° C.) and into the first reactor through the outer dipleg.

The polymer produced in this experiment has a structure of 75.0% trans-1,4-polybutadiene, 15.0% cis-1,4-polybutadiene, 4.2% 1,2-polybutadiene, and 5.8% styrene. Ozonixed Gradient HPLC with UV detection gave styrene sequences of 62.1% 1-styrene, 32.0% 2-styrene, 5.5% 3-styrene, 0.4% 4-styrene and 0%>4-styrene.

The following table summarizes trans styrene-butadiene copolymers made by a continuous process using continuous stirred tank reactors with a constant flow rate, constant residence time, and controlled polymerization temperature of between 150° F. and 225° F.

| Styrene | Trans content | Tg | Tm | Mn | Mw | Mooney |
|---|---|---|---|---|---|---|
| 10.6 | 81.7 | −77.4 | 17.6 | 163,400 | 280,300 | 101 |
| 12.6 | 78.3 | −73.2 | 2.2 | 120,100 | 221,800 | 33 |
| 12.9 | 78 | −70.5 | 3.2 | 109,800 | 220,800 | 45 |
| 27.4 | 82.1 | −58 | 0 | 142,400 | 227,800 | 31 |
| 5.8 | 79.5 | −79.8 | 12.2 | 146,000 | 298,000 | 77 |
| 8.3 | 81.2 | −76.8 | 11.7 | 156,100 | 294,300 | 74 |
| 21.5 | 81.8 | −66.2 | −2.7 | 135,800 | 242,200 | 52 |
| 37.9 | 81.8 | −48.6 | 0 | 144,800 | 230,100 | 38 |
| 3.7 | 80.1 | −81.4 | 12.7 | 164,200 | 314,700 | 75 |

Ozonolysis Shows Random Trans-SBR

U.S. Pat. No. 4,996,273 shows that barium nonylphenolate produces trans-styrene-butadiene rubber with a large amount of block styrene. In addition, barium mentholate and barium thymol produces a large block of styrene in the copolymer network. The novel invention of barium ethers produces a completely random solution SBR as indicated via ozonolysis as well as NMR. See data tables below.

| Styrene | 1S | 2S | 3S | 4S | 5S | >5S |
|---|---|---|---|---|---|---|
| 10.6 | 49.9 | 36.3 | 11.8 | 2.0 | 0.0 | 0.0 |
| 12.6 | 45.6 | 38.2 | 13.7 | 2.5 | 0.0 | 0.0 |
| 12.9 | 45.3 | 38.5 | 13.7 | 2.5 | 0.0 | 0.0 |
| 27.4 | 22.7 | 34.5 | 21.3 | 10.4 | 5.2 | 5.9 |
| 5.8 | 62.1 | 32.0 | 5.5 | 0.4 | 0.0 | 0.0 |
| 8.3 | 48.1 | 38.3 | 9.5 | 4.1 | 0.0 | 0.0 |
| 21.5 | 27.3 | 37.1 | 20.3 | 8.1 | 3.7 | 3.5 |
| 37.9 | 16.7 | 29.0 | 23.0 | 13.2 | 7.6 | 10.5 |
| 3.7 | 69.5 | 27.3 | 2.7 | 0.5 | 0.0 | 0.0 |

Example 36

The procedure described in Example 35 was utilized in this experiment except that the catalyst levels were increased by raising the barium level to 1.0 millimoles barium per hundred grams of monomer. The other two catalyst components were increased to maintain 4 moles of TOA per mole barium, and 3 moles n-BuLi per mole barium. The polymer produced gave a Mooney Large value of 23 and a Mz value of 594,600.

After collection of the above sample a 7.5% solution of silicon tetrachloride in hexane was metered into the cement mixer at 43.24 grams per hour giving 2.0 moles of silicon tetrachloride per mole barium catalyst. A cement sample was then collected using the technique above for sample collection, shortstopping and protection. This polymer sample gave a Mooney Large value of 57 with a Mz of 1,644,000.

| Styrene | Trans content | Tg | Tm | Mn | Mw | |
|---|---|---|---|---|---|---|
| | | | | | | Base Mooney |
| 6.4 | 81.1 | −84.3 | 18 | 56930 | 165500 | 23 |
| | | | | | | SiCl4 Coupled Mooney |
| 6.9 | 80.7 | −84.4 | 16.2 | 64670 | 176000 | 57 |

Example 37

The procedure described in Example 36 was utilized in this experiment except that after collection of the base polymer without coupling, a 10% ethyl benzoate in hexane solution was metered into the cement mixer at 57.66 grams per hour giving 4.0 moles of ethyl benzoate per mole barium catalyst.

The base polymer gave a Mooney Large of 24 with a Mz of 745,000. The ethyl benzoate coupled polymer gave a Mooney Large of 70 with a MZ of 2,492,000.

| Styrene | Tg | Tm | Mn | Mw | |
|---|---|---|---|---|---|
| | | | | | Base Mooney |
| 7.1 | −83.2 | 16.1 | 57290 | 19100 | 24 |
| | | | | | Coupled Mooney |
| 7.1 | −82.9 | 14.7 | 70830 | 527200 | 71 |

Example 38 trans-PolyButadiene Statistical Design

The procedure described in example 9 was utilized in these examples except the ratios of TOA was changed in relation to the molar ratio of nBuLi, while maintaining a constant BaDEGEE molar ratio. The glass transition temperature (TG), melting Point (Tm), Mooney viscosity (ML-4), number average molecular weight (Mn), weight average molecular weight (Mw), and trans 1,4-polybutadiene unit content of the resulting polymers are shown in the table below.

| Ba mol ratio | Li mol ratio | Al:Li | Tg | Tm | Cis PBD | Trans PBD | 1,2-PBD | Mn | Mw | ML 1+4 |
|---|---|---|---|---|---|---|---|---|---|---|
| 1 | 3 | 1.09 | −116.12 | 2.18 | 19.2 | 74.6 | 6.2 | 1.43E+05 | 1.81E+05 | 33.26 |
| 1 | 3 | 1.3 | −95.49 | 8.15 | 18.5 | 75 | 5.5 | 1.82E+05 | 2.47E+05 | 72.48 |
| 1 | 3 | 1.3 | −97.09 | 11.79 | 18.5 | 73.87 | 7.63 | 1.85E+05 | 2.25E+05 | 57 |
| 1 | 3 | 1.3 | −84.53 | 15.76 | 17.2 | 78.2 | 4.6 | 2.03E+05 | 2.41E+05 | 76.13 |
| 1 | 3 | 1.3 | −99.44 | 15.54 | 17.8 | 77.5 | 4.7 | 2.20E+05 | 2.60E+05 | 88.77 |
| 1 | 3 | 1.51 | −94.97 | 21.31 | 15.6 | 80.3 | 4.1 | 2.15E+05 | 2.60E+05 | 127.5 |
| 1 | 3 | 1.51 | −91.91 | 34.67, 44.36 | 13.7 | 82.3 | 4 | 1.16E+05 | 1.23E+05 | 23.96 |
| 1 | 3 | 1.09 | −94.87 | 5.35 | 19.4 | 74.8 | 5.8 | 2.39E+05 | 3.98E+05 | 126.24 |
| 1 | 3 | 1 | −94.58 | 22.47 | 13.7 | 74.8 | 5.8 | 2.14E+05 | 2.91E+05 | 112.77 |
| 1 | 3 | 1.3 | −90.73 | 16.71 | 17.4 | 77.7 | 4.9 | 1.36E+05 | 1.59E+05 | 45.62 |

The procedure described in the above example was utilized in these examples expect the molar ratio of BaDEGEE, TOA and n-BuLi was varied, in order to study the effects on trans content, melt temperature and molecular weight. The glass transition temperature (TG), melting Point (Tm), Mooney viscosity (ML-4), number average molecular weight (Mn), weight average molecular weight (Mw), conversion and trans 1,4-polybutadiene unit content of the resulting polymers are shown in the table below.

| Ba Mole ratio | Al Mole ratio | Li Mole ratio | Tg | Tm | Cis | Trans | 1,2 PBD | Mn | Time (min) | Conversion (%) |
|---|---|---|---|---|---|---|---|---|---|---|
| 1.00 | 3.41 | 2.41 | −91.65 | 21.76 | 17 | 78.5 | 4.5 | 5.99E+04 | 45.45 | 92.92 |
| 1.00 | 4 | 3 | −92.72 | 22.21 | 16.2 | 79 | 4.8 | 7.97E+04 | 50 | 92.16 |
| 1.00 | 3.41 | 2.41 | −88.93 | 26.89 | 17.3 | 78.4 | 4.3 | 1.08E+05 | 120 | 88.22 |
| 1.00 | 4.59 | 3.59 | −97.02 | 15.64 | 15.1 | 81.1 | 3.8 | 1.22E+05 | 120 | 88.94 |
| 1.00 | 4.59 | 3.59 | −89.86 | 34.66 | 14.3 | 81.8 | 3.9 | 5.83E+04 | 60 | 92.42 |
| 1.00 | 4 | 3 | −90.87 | 29.76 | 15.4 | 80.5 | 4.1 | 3.16E+04 | 52 | 95.24 |
| 1.00 | 4 | 3 | −91.63 | 31.57 | 16.4 | 79.6 | 4 | 8.87E+04 | 72 | 91.62 |
| 1.00 | 3 | 3 | −91.66 | 4.09 | 20.1 | 74 | 5.9 | 8.37E+04 | 60 | 84.62 |
| 1.00 | 3.41 | 3.59 | −93.9 | 3.04 | 20.1 | 74.2 | 5.7 | 9.87E+04 | 93 | 90.51 |
| 1.00 | 4 | 4 | −92.83 | 14.76 | 18.6 | 76.4 | 5 | 7.24E+04 | 51.5 | 92.53 |
| 1.00 | 4 | 3 | −97.56 | −34 | 30.8 | 61.4 | 7.8 | 9.56E+04 | 44 | 91.43 |

Example 39

The procedure described in Example 34 was utilized in this experiment except that there were two premix streams employed to give 10 parts of styrene, 10 parts of isoprene and 80 parts of 1,3-butadiene. A stream of 19.704% 1,3-butadiene in hexane, containing 50 parts 1,2-butadiene per million parts 1,3-butadiene, metered at 3981.6 grams per hour was added to a stream of 10.242% isoprene and 9.920% styrene in hexane metered at a rate of 987.49 grams per hour. The combined streams were then fed through a heat exchanger at 200° F. (93° C.) and into the first reactor through the outer dipleg.

An 10.00% solution of BaDEGEE (barium salt of di(ethyleneglycol)ethylether) in hexane with a flow rate of 14.76 grams per hour was added to a 25.0% TOA (trioctylaluminum) in hexane with a flow rate of 21.86 grams per hour, and this mixture was added to a 1.866% n-BuLi (n-butyllithium) in hexane with a flow rate of 38.39 grams per hour. This solution was passed through a heat exchanger at 200° F. (93° C.) and then entered the first reactor through the inner dipleg. This gave a feed rate of 0.38 millimoles barium per 100 grams of monomer, 4 moles of TOA per mole barium, and 3 moles n-BuLi per mole barium.

The polymer produced in this experiment had a Mooney large value of 89 and a structure of 68.8% trans-1,4 polybutadiene, 13.6% cis-1,4-polybutadiene, 3.5% 1,2-polybutadiene, 4.3% Cis-1,4-Polyisoprene, 3.4% trans-1,4-polyisoprene, 1.0% 3,4-polyisoprene and 5.4% styrene. Ozonixed Gradient HPLC with UV detection gave styrene sequences of 3.9% 1 Styrene units, 1.5% 2 to 4 Styrene units, 0% >4% Styrene.

Example 40

The procedure described in Example 39 was utilized in this experiment to synthesize a styrene-isoprene-butadiene rubber except that there were two premix streams employed to give 5 parts of styrene, 5 Parts isoprene and 90 parts butadiene. A stream of 16.727% 1,3-butadiene in hexane, containing 50 parts 1,2-butadiene per million parts 1,3-butadiene, metered at 4280.3 grams per hour was added to a stream of 5.616% isoprene and 5.943% styrene in hexane metered at a rate of 688.2 grams per hour. The combined streams were then fed through a heat exchanger at 200° F. (93° C.) and into the first reactor through the outer dipleg.

The polymer produced in this experiment had Mooney large value of 106 and a structure of 76.9% trans-1,4 polybutadiene, 13.1% cis-1,4-polybutadiene, 3.6% 1,2-polybutadiene, 1.9% cis-1,4-polyisoprene, 1.4% trans-1,4-polyisoprene, 0.5% 3,4-polyisoprene and 2.6% styrene. Ozonixed Gradient HPLC with UV detection gave styrene sequences of 3.9% 1 Styrene units, 1.5% 2 to 4 Styrene units, 0% >4% Styrene.

Example 41

The procedure described in Example 40 was utilized in this experiment except that catalyst and modifier streams were lowered to 10.00% solution of BaDEGDE (barium salt of di(ethyleneglycol)ethylether) in hexane with a flow rate of 14.41 grams per hour was added to a 25.0% TOA (trioctylaluminum) in hexane with a flow rate of 21.35 grams per hour, and this mixture was added to a 1.866% n-BuLi (n-butyllithium) in hexane with a flow rate of 37.48 grams per hour. This solution was passed through a heat exchanger at 200° F. (93° C.) and then entered the first reactor through the inner dipleg. This gave a feed rate of 0.38 millimoles barium per 100 grams of monomer, 4 moles of TOA per mole barium, and 3 moles of n-butyllithium (n-BuLi) per mole barium.

The polymer produced in this experiment had a Mooney large value of 87 and a structure of 71.1% trans-1,4 polybutadiene, 14.9% cis-1,4-polybutadiene, 4.3% 1,2-polybutadiene, 4.5% cis-1,4-polyisoprene, 4.1% trans-1,4-polyisoprene, 1.1% 3,4-polyisoprene.

The following table depicts the styrene-isoprene-butadiene rubbers synthesized by a continuous process.

| Styrene | 1,2-PBD | trans-1,4-PBD | cis-1,4-PBD | cis-1,4-PI | trans-1,4-PI | Mooney | Tg | Tm | Mn | Mw |
|---|---|---|---|---|---|---|---|---|---|---|
| 5.4 | 3.5 | 68.8 | 13.6 | 4.3 | 3.4 | 89 | −83.8 | −5.6 | 176,800 | 324,400 |
| 2.6 | 3.6 | 76.9 | 13.1 | 1.9 | 1.4 | 106 | −85.5 | 18.3 | 160,300 | 313,600 |

Example 42

The procedure described in Example 34 was utilized in this experiment except that there were two premix streams employed to give 10 parts isoprene and 90 parts butadiene. A stream of 19.704% 1,3-butadiene in hexane, containing 50 parts 1,2-butadiene per million parts 1,3-butadiene, metered at 3981.6 grams per hour was added to a stream of 10.242% isoprene and 9.920% styrene in hexane metered at a rate of 987.49 grams per hour. The combined streams were then fed through a heat exchanger at 200° F. (93° C.) and into the first reactor through the outer dipleg.

A 10.00% solution of BaDEGDE (barium salt of di(ethyleneglycol)ethylether) in hexane with a flow rate of 19.92 grams per hour was added to a 25.0% TOA (trioctylaluminum) in hexane with a flow rate of 29.51 grams per hour, and this mixture was added to a 1.866% n-BuLi (n-butyllithium) in hexane with a flow rate of 51.81 grams per hour. This solution was passed through a heat exchanger at 200° F. (93° C.) and then entered the first reactor through the inner dipleg. This gave a feed rate of 0.50 millimoles barium per 100 grams of monomer, 4 moles of TOA per mole barium, and 3 moles n-BuLi per mole barium.

The polymer produced in this experiment had a Mooney large value of 62 and a structure of 71.3% trans-1,4 polybutadiene, 14.8% cis-1,4-polybutadiene, 4.1% 1,2-polybutadiene, 4.7% Cis-1,4-Polyisoprene, 4.1% Trans-1,4-Polyisoprene, 1.0% 3,4-Polyisoprene.

The following table depicts the isoprene-butadiene rubbers synthesized by a continuous process.

| trans-1,4-PBD | cis-1,4-PBD | cis-1,4-PI | trans-1,4-PI | 3-4-PI | Mooney | Tg | Tm | Mn | Mw |
|---|---|---|---|---|---|---|---|---|---|
| 71.3 | 14.8 | 4.7 | 4.1 | 1 | 62 | −90.1 | 1.45 | 153,500 | 359,000 |
| 71.1 | 14.9 | 4.5 | 4.1 | 1.1 | 87 | −91.2 | −1.7 | 217,500 | 448,900 |

Example 43

In this experiment, 1063 grams of a silica/alumna/molecular sieve dried premix containing 18.8 weight percent butadiene was charged into a one-gallon (3.79 liter) reactor. Then, 1.22 ml of a 0.47M solution of the barium salt of di(ethylene glycol)ethylether (BaDEGEE) in ethylbenzene, 2.29 ml of a 1.0M solution of tri-n-octylaluminum (TOA) in hexanes, 1.71 ml of a 0.99M solution of n-butyllithium (n-BuLi) in hexanes, and 0.57 ml of a 1.0 M solution of piperidine in hexanes were added to the reactor. The molar ratio of BaDEGEE to TOA to n-BuLi to piperidine was 1:4:3:1.

The polymerization was carried out at 90° C. The GC analysis of the residual monomer contained in the polymerization mixture indicated that the monomer conversions at 90 and 130 minutes were 89.5% and 92.4%, respectively. Then, 3 ml of 1.0M ethanol was added to shortstop the polymerization. The polymer cement was then removed from the reactor and stabilized with 1 phm of antioxidant. After evaporating the hexanes solvent, the resulting polymer was dried in a vacuum oven at 50° C.

The polybutadiene produced was determined to have a glass transition temperature (Tg) at −92° C. and a melting temperature (Tm) at 19.6° C. The Mooney ML-4 viscosity of the polymer was determined to be 114 at 100° C. The GPC measurements indicated that the polymer has a number average molecular weight (Mn) of 189,800 g/mol and a weight average molecular weight (Mw) of 264,500 g/mol. The polydispersity (Mw/Mn) of the resulting polymer was determined to be 1.91.

Example 44

The procedure described in Example 1 was utilized in this example except that 3.43 ml of a 1.0M solution of piperidine in hexanes was added. This made the molar ratio of Ba to TOA to n-BuLi to piperidine) 1:4:3:6. The GC analysis of the residual monomer contained in the polymerization mixture indicated that the monomer conversions at 5 hours and 6 hours were 89.9% and 91.7%, respectively. The resulting polybutadiene polymer was determined to have a glass transition temperature (Tg) at −90° C. and a melting point (Tm) at 20.0° C. The Mooney ML-4 viscosity at 100° C. was determined to be 56. The number average molecular weight (Mn) and the weight average molecular weight (Mw) of the resulting polymer were determined to be 400,100 g/mol and 630,300 g/mol. The resulting polymer accordingly had a polydispersity of 2.23.

Example 45

In this experiment, 986 grams of a silica/alumna/molecular sieve dried premix containing 20.27 weight percent 1,3-butadiene and 900 grams of hexane were charged into a one-gallon (3.79 liter) reactor. Then, 2.0 ml of 0.5M solution of barium salt of di(ethylene glycol) ethylether (BaDEGEE) in ethylbenzene, 4 ml of a 1.0M solution of tri-n-octylaluminum (TOA) in hexanes, 3 ml of a 0.99M solution of n-butyllithium (n-BuLi) in hexanes, and 1.0 ml of a 1.0M solution of pyrrolidine in hexanes were added to the reactor. The molar ratio of BaDEGEE to TOA to n-BuLi to Pyrrolidine was 1:4:3:1.

The polymerization was carried out at 90° C. The GC analysis of the residual monomer contained in the polymerization mixture indicated that the monomer conversions at 150 minutes and 300 minutes were 99.1% and 95.9%, respectively. Then, 3 ml of 1.0M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −88.8° C. and a melting temperature (Tm) at 35.0° C. The Mooney ML-4 viscosity at 1000 was determined to be 104. The GPC measurements indicated that the polymer has a number average molecular weight (Mn) of 245,200 g/mol and a weight average molecular weight (Mw) of 271,900 g/mol. The polydispersity (Mw/Mn) of the resulting polymer was determined to be 1.11. The polymer was determined by HPLC analysis to contain 92% pyrrodine functionalization. Carbon-13 NMR analysis showed a trans-1,4-butadiene content of 83.6%, a cis-1,4-butadiene content of 12.9%, and 1,2-butadiene content of 3.5%.

Example 46

The procedure described in Example 3 was utilized in this example except that 2.0 ml of 1.0 M solution of Pyrrolidine in hexanes was added. The molar ratio of barium to TOA to n-BuLi to pyrrolidine was accordingly 1:4:3:2. The GC analysis of the residual monomer contained in the polymerization mixture indicated that the monomer conversions at 262 minutes and 300 minutes were 92.5% and 95.1%, respectively. The resulting polybutadiene polymer was determined to have a glass transition temperature (Tg) at −87.7° C. and a melting point (Tm) at 37.9° C. The Mooney ML-4 viscosity of the polymer at 100° C. was determined to be 56. The number average molecular weight (Mn) and the weight average molecular weight (Mw) of the resulting polymer were determined to be 316,300 g/mol and 521,200 g/mol. The polymer accordingly had a polydispersity of 1.65. The polymer was determined by HPLC analysis to contain 92% pyrrodine functionalization. The effect of the amount of pyrrolidine used on the amount of amine functionalization is reported in the following table. Carbon-13 NMR analysis showed a trans-1,4-butadiene content of 82.6%, a cis-1,4-butadiene content of 14.1%, and 1,2-butadiene content of 3.3%.

| Barium:pyrrodidine:Al:Li Ratio | % Pyrrolidene |
|---|---|
| 1:3:4:3 | 68 |
| 1:2:4:3 | 81 |
| 1:1:4:3 | 92 |

Example 47

In this experiment, 1038 grams of a silica/alumna/molecular sieve dried premix containing 19.3 weight percent 1,3-butadiene was charged into a one-gallon (3.79 liter) reactor. Then, 1.22 ml of a 0.47 M solution of the barium salt of di(ethylene glycol) ethylether (BaDEGEE) in ethylbenzene, 2.29 ml of a 1.0 M solution of tri-n-octylaluminum (TOA) in hexanes, 1.71 ml of a 0.99 M solution of n-butyllithium (n-BuLi) in hexanes, and 0.571 ml of a 1.0 M solution of TMEDA in hexanes were added to the reactor. The molar ratio of BaDEGEE to TOA to n-BuLi to TMEDA was 1:4:3:1.

The polymerization was carried out at 90° C. The GC analysis of the residual monomer contained in the polymerization mixture indicated that the monomer conversions at 120 minutes and 190 minutes were 89.7% and 93.4%, respectively. Then, 3 ml of 1.0 M ethanol was added to shortstop the polymerization. The polymer cement was then removed from the reactor and stabilized with 1 phm of antioxidant. After evaporating the hexanes solvent, the resulting polymer was dried in a vacuum oven at 50° C.

The polybutadiene produced was determined to have a glass transition temperature (Tg) at −90.9° C. and a melting temperature (Tm) at 14.8° C. The Mooney ML-4 viscosity at 100° C. was determined to be 133. The GPC measurements indicated that the polymer had a number average molecular weight (Mn) of 229,900 g/mol and a weight average molecular weight (Mw) of 349,000 g/mol. The polydispersity (Mw/Mn) of the resulting polymer was accordingly 1.52. Carbon-13 NMR analysis showed a trans-1,4-butadiene content of 78.1%, cis-1,4-butadiene content of 17.2%, and a 1,2-butadiene content of 4.7%.

Example 48

The procedure described in Example 5 was utilized in this example except that 1.43 ml of 1.0 M solution of TMEDA in hexanes was added. The molar ratio of barium to TOA to n-BuLi to TMEDA was 1:4:3:2.5. The GC analysis of the residual monomer contained in the polymerization mixture indicated that the monomer conversions at 272 minutes and 345 minutes were 70.7% and 76.3%, respectively. The resulting polybutadiene polymer was determined to have a glass transition temperature (Tg) at −90.8° C. and a melting point (Tm) at −22.5° C. The Mooney ML-4 viscosity at 100° C. was determined to be 39. The number average molecular weight (Mn) and the weight average molecular weight (Mw) of the resulting polymer were determined to be 136,700 g/mol and 500,500 g/mol. The polymer accordingly had a polydispersity of 3.66. Carbon-13 NMR analysis showed a trans-1,4-butadiene content of 65.9%, a cis-1,4-butadiene content of 22.3%, and a 1,2-butadiene content of 11.8%.

Example 49

The procedure described in Example 5 was utilized in this example except that 2.29 ml of 1.0 M solution of TMEDA in hexanes was added. The molar ratio of barium to TOA to n-BuLi to TMEDA was 1:4:3:4. The GC analysis of the residual monomer contained in the polymerization mixture indicated that the monomer conversions at 220 minutes and 360 minutes were 59.7% and 72.9%, respectively. The resulting polybutadiene polymer was determined to have a glass transition temperature (Tg) at −89.1° C. and a melting point (Tm) at −34.2° C. The Mooney ML-4 viscosity at 100° C. was determined to be 37. The number average molecular weight (Mn) and the weight average molecular weight (Mw) of the resulting polymer were 118,400 g/mol and 435,400 g/mol, resulting in a polydispersity of 3.68. Carbon-13 NMR analysis showed a trans-1,4-butadiene content of 62.5%, a cis-1,4-butadiene content of 21.0%, and a 1,2-butadiene content of 16.5%.

Example 50

The procedure described in Example 5 was utilized in this example except that 3.43 ml of 1.0 M solution of TMEDA in hexanes was added. The molar ratio of barium to TOA to n-BuLi to TMEDA was 1:4:3:6. The GC analysis of the residual monomer contained in the polymerization mixture indicated that the monomer conversions at 7 hours and 22 hours were 82.2% and 92.4%, respectively. The resulting polybutadiene polymer was determined to have a glass transition temperature (Tg) at −84.8° C. and it had no melting point (Tm). The Mooney ML-4 viscosity at 100° C. was determined to be 19. The number average molecular weight (Mn) and the weight average molecular weight (Mw) of the resulting polymer were determined to be 112,700 g/mol and 344,600 g/mol, resulting in a polydispersity of 3.06. Carbon-13 NMR analysis showed a trans-1,4-butadiene content of 65.9%, a cis-1,4-butadiene content of 22.3%, and 1,2-butadiene content of 11.8%.

Example 51

In this experiment, 1442 g of a silica/alumna/molecular sieve dried premix containing 20.8 weight percent butadiene was charged into a one-gallon (3.79 liter) reactor. Then, 2.13 ml of a 0.56 M solution of the barium salt of di(ethylene glycol) ethylether (BaDEGEE) in ethylbenzene, 4.8 ml of a 1.0 M solution of tri-n-octylaluminum (TOA) in hexanes, 3.55 ml of 1.015 M solution of n-butyllithium (n-BuLi) in hexanes, and 1.2 ml of 1.0 M butyl amine in hexanes were added to the reactor. The molar ratio of BaDEGEE to TOA to n-BuLi to butyl amine was 1:4:3:1.

The polymerization was carried out at 90° C. The GC analysis of the residual monomer contained in the polymerization mixture indicated that the monomer conversions at 155.5 and 196.5 minutes were 93.9% and 95.8%, respectively. Then, 3 ml of 1.0 M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −88.2° C. and had a dual melting temperature (Tm) at 12.8° C. and 31.7° C. The GPC measurements indicated that the polymer has a number average molecular weight (Mn) of 81,380 g/mol and a weight average molecular weight (Mw) of 134,600 g/mol. The polydispersity (Mw/Mn) of the resulting polymer was 1.65.

Example 52

The procedure described in Example 9 was utilized in this experiment except that 2.4 ml of a 1.0 M solution of butyl amine in hexanes was added. The molar ratio of barium to TOA to n-BuLi to butyl amine was 1:4:3:2. The GC analysis of the residual monomer contained in the polymerization mixture indicated that the monomer conversions at 360 minutes and 400 minutes were 92.1% and 92.5%, respectively. The resulting polybutadiene polymer was determined to have a glass transition temperature (Tg) at −91.9° C. and a melting point (Tm) at −10.8° C. The number average molecular weight (Mn) and the weight average molecular weight (Mw) of the resulting polymer were 63,160 g/mol and 148,000 g/mol, resulting in a polydispersity of 2.34.

Example 53

In this experiment, 1298 grams and 148.5 grams of a silica/alumna/molecular sieve dried premix containing 20.8 weight percent 1,3-butadiene and 20.2 weight percent styrene respectively was charged into a one-gallon (3.79 liter) reactor. Then, 2.13 ml of a 0.56 M solution of the barium salt of di(ethylene glycol) ethylether (BaDEGEE Chemetal), 4.8 mL of a 1.0 M solution of tri-n-octylaluminum (TOA) in hexanes, 3.55 mL of a 1.015 M solution of n-butyllithium (n-BuLi) in hexanes, and 1.2 ml of a 1.0 M solution of piperidine in hexanes were added to the reactor. The molar ratio of BaDEGEE to TOA to n-BuLi to Piperidine was 1:4:3:1.

The polymerization was carried out at 90° C. The GC analysis of the residual monomer contained in the polymerization mixture indicated that the total monomer conversions at 252 minutes and 351 minutes were 92.9% and 95.21%, respectively. Then, 3 ml of 1.0 M ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −82.7° C. and a melting temperature (Tm) at 18.36° C. The Mooney ML-4 viscosity at 100° C. was determined to be 78. The GPC measurements indicated that the polymer has a number average molecular weight (Mn) of 138,500 g/mol and a weight average molecular weight (Mw) of 182,800 g/mol. The polydispersity (Mw/Mn) of the resulting polymer was 1.32.

Example 54

The procedure described in Example 11 was utilized in this example except that 2.4 ml of a 1.0 M solution of piperidine in hexanes was added. The molar ratio barium to TOA to n-BuLi to piperidine) was 1:4:3:2. The GC analysis of the residual monomer contained in the polymerization mixture indicated that the total monomer conversions at 116 minutes and 226 minutes were 77.2% and 90.1%, respectively. The resulting polybutadiene polymer was determined to have a glass transition temperature (Tg) at −82.1° C. and a melting point (Tm) at 17.1° C. The number average molecular weight (Mn) and the weight average molecular weight (Mw) of the resulting polymer were 168,700 g/mol and 228,900 g/mol, resulting in a polydispersity of 1.36.

Example 55

The procedure described in Example 11 was utilized in this example except that 3.6 ml of a 1.0 M solution of piperidine in hexanes was added. The molar ratio of barium to TOA to n-BuLi to Piperidine was 1:4:3:3. The GC analysis of the residual monomer contained in the polymerization mixture indicated that the total monomer conversions at 250 minutes and 333 minutes were 90.22% and 94.1%, respectively. The resulting polybutadiene polymer was determined to have a glass transition temperature (Tg) at −84.4° C. and a melting point (Tm) at 13.2° C. The Mooney ML-4 viscosity of the polymer at 100° C. was 99. The number average molecular weight (Mn) and the weight average molecular weight (Mw) of the resulting polymer were 239,300 g/mol and 335,500 g/mol, resulting in a polydispersity of 1.40.

Example 56

The procedure described in Example 11 was utilized in this example except that 4.8 ml of 1.0 M solution of piperidine in hexanes was added. The molar ratio of barium to TOA to n-BuLi to piperidine) was 1:4:3:4. The GC analysis of the residual monomer contained in the polymerization mixture indicated that the total monomer conversions at 262 minutes and 20 hours were 87.5% and 96.9%, respectively. The resulting polybutadiene polymer was determined to have a glass transition temperature (Tg) at −83.4° C. and a melting point (Tm) at 11.2° C. The number average molecular weight (Mn) and the weight average molecular weight (Mw) of the resulting polymer were 256,100 g/mol and 432,600 g/mol, resulting in a polydispersity of 1.69.

Example 57

The procedure described in Example 11 was utilized in this example except that 7.2 ml of 1.0 M solution of piperidine in hexanes was added. The molar ratio of barium to TOA to n-BuLi to piperidine was 1:4:3:6. The GC analysis of the residual monomer contained in the polymerization mixture indicated that the total monomer conversions at 310 minutes and 500 minutes were 80.7% and 94.3%, respectively. The resulting polybutadiene polymer was determined to have a glass transition temperature (Tg) at −85.2° C. and a melting point (Tm) at 9.9° C. The Mooney ML-4 viscosity at 100° C. was 92.4. The number average molecular weight (Mn) and the weight average molecular weight (Mw) of the resulting polymer were 235,000 g/mol and 454,300 g/mol, resulting in a polydispersity of 1.93.

Example 58

In this experiment, 1298 grams and 148.5 grams of a silica/alumna/molecular sieve dried premix containing 20.8 weight percent 1,3-butadiene and 20.2 weight percent styrene respectively was charged into a one-gallon (3.79 liter) reactor. Then, 2.13 ml of a 0.56 M solution of the barium salt of di(ethylene glycol) ethylether (BaDEGEE Chemetal), 4.8 ml of a 1.0 M solution of tri-n-octylaluminum (TOA) in hexanes, 3.55 ml of a 1.015 M solution of n-butyllithium (n-BuLi) in hexanes, and 2.4 ml of a 1.0 M solution of pyrrolidine in hexanes were added to the reactor. The molar ratio of BaDEGEE to TOA to n-BuLi to Pyrrolidine was 1:4:3:2.

The polymerization was carried out at 90° C. The GC analysis of the residual monomer contained in the polymerization mixture indicated that the total monomer conversions at 180 minutes and 239 minutes were 91.7% and 93.6%, respectively. Then, 3 ml of 1.0 M ethanol was added to shortstop the polymerization. The polymer cement was then removed from the reactor and stabilized with 1 phm of antioxidant. After evaporating hexanes, the resulting polymer was dried in a vacuum oven at 50° C. The polybutadiene produced was determined to have a number average molecular weight (Mn) of 143,600 g/mol and a weight average molecular weight (Mw) of 192,000 g/mol. The polydispersity (Mw/Mn) of the resulting polymer was 1.34.

Example 59

In this experiment, 1308 grams and 133.6 grams of a silica/alumna/molecular sieve dried premix containing 20.6 weight percent 1,3-butadiene and 22.5 weight percent styrene respectively was charged into a one-gallon (3.79 liter) reactor. Then, 2.13 ml of a 0.56 M solution of the barium salt of di(ethylene glycol) ethylether (BaDEGEE), 4.8 ml of a 1.0 M solution of tri-n-octylaluminum (TOA) in hexanes, 3.55 ml of a 1.015 M solution of n-butyllithium (n-BuLi) in hexanes, and 2.4 ml of a 1.0 M solution of TMEDA in hexanes were added to the reactor. The molar ratio of BaDEGEE to TOA to n-BuLi to TMEDA was 1:4:3:2.

The polymerization was carried out at 90° C. Then, 3 ml of 1.0 M ethanol was added to shortstop the polymerization. The polymer cement was then removed from the reactor and stabilized with 1 phm of antioxidant. After evaporating hexanes, the resulting polymer was dried in a vacuum oven at 50° C. The polybutadiene produced was determined to have a number average molecular weight (Mn) of 123,300 g/mol and a weight average molecular weight (Mw) of 208,400 g/mol. The polydispersity (Mw/Mn) of the resulting polymer was 1.69.

Example 60

In this experiment, 1063 grams of a silica/alumna/molecular sieve dried premix containing 18.8 weight percent 1,3-butadiene was charged into a one-gallon (3.79 liter) reactor. Then, 1.22 ml of a 0.47 M solution of the barium salt of di(ethylene glycol) ethylether (BaDEGEE) in ethylbenzene, 2.29 ml of a 1.0 M solution of tri-n-octylaluminum (TOA) in hexanes, 1.71 ml of a 0.99M solution of n-butyllithium (n-BuLi) in hexanes, and 0.57 ml of a 1.0 M solution of piperidine in hexanes were added to the reactor. The molar ratio of BaDEGEE to TOA to n-BuLi to piperidine was 1:4:3:1.

The polymerization was carried out at 90° C. The GC analysis of the residual monomer contained in the polymerization mixture indicated that the monomer conversions at 90 minutes and 130 minutes were 89.5% and 92.4%, respectively. Then, 3 ml of 1.0 M ethanol was added to shortstop the polymerization. The polymer cement was then removed from the reactor and stabilized with 1 phm of antioxidant. After evaporating the hexanes solvent, the resulting polymer was dried in a vacuum oven at 50° C.

The polybutadiene produced was determined to have a glass transition temperature (Tg) at −92° C. and a melting temperature (Tm) at 19.6° C. The Mooney ML-4 viscosity at 100° C. was determined to be 114. The GPC measurements indicated that the polymer has a number average molecular weight (Mn) of 189,800 g/mol and a weight average molecular weight (Mw) of 264,500 g/mol. The polydispersity (Mw/Mn) of the resulting polymer was 1.91.

Example 61

The procedure described in Example 1 was utilized in this example except that 3.43 ml of a 1.0 M solution of piperidine in hexanes was added. The molar ratio barium to TOA to n-BuLi to piperidine was 1:4:3:6. The GC analysis of the residual monomer contained in the polymerization mixture indicated that the monomer conversions at 5 hours and 6 hours were 89.9% and 91.7%, respectively. The resulting polybutadiene polymer was determined to have a glass transition temperature (Tg) at −90° C. and a melting point (Tm) at 20.0° C. The Mooney ML-4 viscosity at 100° C. was 56. The number average molecular weight (Mn) and the weight average molecular weight (Mw) of the resulting polymer were 400,100 g/mol and 630,300 g/mol, resulting in a polydispersity of 2.23.

Summary Table of Amine Functionalized HTPBd and HTSBR

In the Order of Examples 43–59

Using a one gallon (3.79 liter) batch reactor, the effects on the barium catalyst system of BaDEGEE/TOA/n-BuLi/X (where X is the amino compound) of several different amino containing compounds were investigated. The following table summarizes the catalyst systems used and the resulting polymer characteristics:

TABLE 6

High trans polymer characteristics

| ID | Amino Compound | Ratio (BaDEGEE/TOA/n-BuLi/X) | Tg (° C.) | Tm (° C.) | ML+4 | Actual Mn | Target Mn | PDI |
|---|---|---|---|---|---|---|---|---|
| PBd | Piperidine | 1/4/3/1 | −92 | 19.6 | 114 | 190K | 350K | 1.91 |
| PBd | Piperidine | 1/4/3/6 | −90 | 20.0 | 56 | 400K | 350K | 2.23 |
| PBd | Pyrrolidine | 1/4/3/1 | −88.8 | 35.0 | 104 | 245K | 200K | 1.11 |
| PBd | Pyrrolidine | 1/4/3/2 | −87.7 | 37.9 | 56 | 316K | 200K | 1.65 |
| PBd | TMEDA | 1/4/3/1 | −90.9 | 14.8 | 133 | 230K | 350K | 1.52 |
| PBd | TMEDA | 1/4/3/2.5 | −90.8 | −22.5 | 39 | 137K | 350K | 3.66 |
| PBd | TMEDA | 1/4/3/4 | −89.1 | −34.2 | 37 | 118K | 350K | 3.68 |
| PBd | TMEDA | 1/4/3/6 | −84.8 | none | 19 | 113K | 350K | 3.06 |
| PBd | Butyl Amine | 1/4/3/1 | −88.2 | 12.8 31.7 |  | 81K | 250K | 1.65 |
| PBd | Butyl Amine | 1/4/3/2 | −91.2 | −10.8 |  | 63K | 250K | 2.34 |
| SBR | Piperidine | 1/4/3/1 | −82.7 | 18.36 | 78 | 139K | 250K | 1.32 |
| SBR | Piperidine | 1/4/3/2 | −82.1 | 17.1 |  | 169K | 250K | 1.36 |
| SBR | Piperidine | 1/4/3/3 | −84.4 | 13.2 | 99 | 239K | 250K | 1.40 |
| SBR | Piperidine | 1/4/3/4 | −83.4 | 11.2 |  | 256K | 250K | 1.69 |
| SBR | Piperidine | 1/4/3/6 | −85.2 | 9.9 | 92.4 | 235K | 250K | 1.93 |
| SBR | Pyrrolidine | 1/4/3/2 |  |  |  | 144K | 250K | 1.34 |
| SBR | TMEDA | 1/4/3/2 |  |  |  | 123K | 250K | 1.69 |

Example 62

Polybutadiene/Polystyrene and Polystyrene/Polybutadiene Block Copolymers In this experiment 1000 grams of premix (1,3-butadiene monomer or styrene) was added to a one-gallon (3.79 liter) batch reactor using BaDEGEE/TOA/nBuLi with molar ratios of 1/4/3. The polymer was carried out until complete conversion. An additional 1000 grams of premix (styrene or 1,3-butadiene) was added to the reactor and polymerized to completion. Hence, a styrene-butadiene to butadiene-styrene trans-block copolymer was prepared. The table below depicts the polymer characterization data.

| Polymer Composition | Tg (° C.) | Tm | Mn | Mw | trans-1,4- PBD | cis-1,4- PBD | 1,2- PBD | Poly- styrene |
|---|---|---|---|---|---|---|---|---|
| 30/70 PS/PBD | −92.32 | 13.82 | 5.09E+04 | 6.15E+04 | 79 | 16.7 | 4.3 | 25. |
| 30/70 PS/PBD | −89.49 | 11.48 | 8.76E+04 | 1.07E+05 | 78.7 | 16.6 | 4.7 | 30. |
| 30/70 PS/PBD | −92.2 | 11.27 | 1.69E+05 | 2.56E+05 | 76.9 | 18.2 | 4.9 | 27. |
| 70/30 PBD/PS | −90.88 | 15.97 | 1.01E+05 | 1.91E+05 | 80.9 | 14.8 | 4.3 | 30. |

Example 63

Styrene-Butadiene-Styrene Triblock

In this experiment 1000 grams of premix (1,3-butadiene monomer or styrene monomer) was added to a one-gallon (3.79 liter) batch reactor using BaDEGEE/TOA/nBuLi with molar ratios of 1/4/3. The polymerization was carried out until complete conversion was attained. An additional 1000 grams of premix (styrene or 1,3-butadiene) was added to the reactor and the polymerization was continued until completion. The polymer was then coupled with ethylbenzoate. Hence an styrene-butadiene-styrene triblock polymer was produced. The table below depicts the polymer characterization data.

| Polymer Composition | Tg ° C. | Tm | Mn | Mw | Coupled Mn | Coupled Mw |
|---|---|---|---|---|---|---|
| 30/70 PS/PBD | −88.63 | 10.35 | 5.73E+04 | 7.17E+04 | 4.85E+05 | 6.30E+05 |
| 30/70 PS/PBD | −91.07 | 14.61 | 2.43E+04 | 2.88E+04 | 3.80E+04 | 5.02E+04 |

Examples 64–65

In this experiment 1,3-butadiene was polymerized at 90° C. using the barium salt of di(ethylene glycol)ethyl ether (Ba-DEGEE), trioctyl aluminum(TOA) and n-BuLi with a target number average molecular weight (Mn) of 100,000. Molar ratios of Ba-DEGEE to TOA to N-BuLi of 1/4/4 and 1/4/3 were used. The DSC results from both runs showed a melt, with the 1/4/3 Ba-DEGEE to TOA to N-BuLi ratio having a higher melt temperature.

Examples 66–68

In this series of experiments the barium salt of 2-N,N-dimethyl amino ethoxy ethanol (Ba-N,N-DMEE), TOA and n-BuLi in a ratio of 1/4/3 were used to polymerize 1,3-butadiene monomer. Experiments were done at 65° C., 75° C. and 90° C. with a target number average molecular weight (Mn) being 100,000. At 90° C., the Mn was only 60,000, while at 65° C., the Mn was much higher, almost reaching the target. The Mn of the 75° C. run was in between the other two. The results from the 65° C. and 75° C. run show two melts on the DSC. At 65° C. and 75° C. the glass transition temperature (Tg) is hidden by the large melts. The activation energy for this system was 16.76 kcal/mol.

Example 69

In this experiment barium di(ethylene glycol)butyl ether (Ba-DEGBE), TOA and n-BuLi were used in a ratio of 1/4/3 to polymerize 1,3-butadiene at 90° C. The target number average molecular weight (Mn) for this run was 100,000, but the actual Mn was 66,660. The glass transition temperature (Tg) and melting point (Tm) were −89.04° C. and 34.32° C., respectively.

Examples 70–71

In this experiment 1,3-butadiene monomer was polymerized at 90° C. and 65° C. using the barium salt of di(ethylene glycol)ethyl hexyl ether (Ba-DEGEHE), TOA and n-BuLi in a ratio of 1/4/3 as the catalyst system. The target number average molecular weight (Mn) was 100,000. The run at 90° C. resulted in a number average molecular weight (Mn) of a 92,910. The 65° C. run gave a number average molecular weight (Mn) of 178,000. The glass transition temperature (Tg) of the 90° C. run was −92.35° C. and the melting point (Tm) was 25.13. The 65° C. run produced a glass transition temperature (Tg) of −99° C. and a melting point (Tm) of 37° C.

Examples 72–73

In this experiment 1,3-polybutadiene and 10/90 styrene-butadiene rubber (SBR) were both made using the barium salt of tetra(ethylene glycol) monomethyl ether (Ba-TEGMME), TOA and n-BuLi at a 1/4/3 molar ratio. Both runs were carried out at 90° C. with a target number average molecular weight (Mn) of 100,000. The number average molecular weights attained in both runs were approximately half of the target. The glass transition temperature (Tg) of the polybutadiene was −99° C. and it had a melting point of 5° C. The styrene-butadiene polymer had a glass transition temperature (Tg) of −89° C. with a melt at −7° C.

Polymer Characteristics for Experiments 64–73.

| Experiment | Polymer | Barium | Ba/TOA/n-BuLi | Run Temp. (° C.) | Mn | Tg (° C.) | Tm (° C.) |
|---|---|---|---|---|---|---|---|
| 64 | PBd | Ba-DEGEE | 1/4/3 | 90 | 59,710 | −89.49 | 33.87 |
| 65 | PBd | Ba-DEGEE | 1/4/4 | 90 | 40,280 | −91.06 | 13.33 |
| 66 | PBd | Ba-N,N-DMEE | 1/4/3 | 90 | 60,580 | −91.5 | 32.20 |
| 67 | PBd | Ba-N,N-DMEE | 1/4/3 | 75 | 76,750 | | 41.05 |
| | | | | | | | 62.86 |
| 67 | PBd | Ba-N,N-DMEE | 1/4/3 | 65 | 92,440 | | 45.13 |
| | | | | | | | 76.94 |
| 69 | PBd | Ba-DEGBE | 1/4/3 | 90 | 66,660 | −89.04 | 34.32 |
| 70 | PBd | Ba-DEGEHE | 1/4/3 | 90 | 92,910 | −92.35 | 25.13 |
| 71 | PBd | Ba-DEGEHE | 1/4/3 | 65 | 178,500 | −98.66 | 37.03 |
| 72 | PBd | Ba-TEGMME | 1/4/3 | 90 | 55,350 | −94.55 | 5.61 |
| 73 | SBR | Ba-TEGMME | 1/4/3 | 90 | 43,260 | −88.99 | −7.29 |

NMR Data for Experiments 64–73.

| Exper. Num. | Trans-1,4-BD | Cis-1,4-BD | 1,2-BD | Styrene |
|---|---|---|---|---|
| 64 | 82.6 | 13.7 | 3.7 | — |
| 66 | 88.1 | 9.7 | 2.2 | — |
| 67 | 74.5 | 20.1 | 5.4 | — |
| 68 | 81.2 | 14.3 | 4.5 | — |
| 69 | 83.3 | 13.2 | 3.5 | — |
| 70 | 81.4 | 14.2 | 4.4 | — |
| 71 | 82.4 | 14.8 | 2.8 | — |
| 73 | 69.9 | 20.1 | 5.3 | 4.7 |

Example 74

In this experiment, 2200 grams of a silica/alumina/molecular sieve dried premix containing 20.01 weight percent 1,3-butadiene was charged into a one-gallon (3.8 liters) reactor. Then, 17.0 ml of a 0.129M solution of a pre-reacted barium catalyst in hexanes was added to the reactor to initiate the polymerization at a temperature of 90° C. The pre-reacted barium catalyst was prepared by mixing the catalyst components in an order wherein the barium salt of di(ethylene glycol) ethylether (BaDEGEE) in ethylbenzene was added first. Then, pyrrolidine was added which was followed by the addition of tri-n-octylaluminum (TOA) in hexanes. In the procedure used, n-butyllithium (n-BuLi) in hexane was added last. The mixture was then heated at 70° C. for 30 minutes before use. The molar ratio of BaDEGEE to pyrrolidine to TOA and to n-BuLi was 1:1:4:3. The amount of barium catalyst used was 0.5 mmole of barium per 100 grams of monomer 1,3-butadiene.

The polymerization was carried out at 90° C. for 1.5 hours. The GC analysis of the residual monomer contained in the polymerization mixture indicated that the monomer conversions at 60 and 90 minutes were 83% and 91%, respectively. The polymerization was continued for an additional 30 minutes. Then, 2 milliliters of neat ethanol was added to shortstop the polymerization. The polymer cement was then removed from the reactor and stabilized with 1 phm of antioxidant. After evaporating hexanes, the resulting polymer was dried in a vacuum oven at 50° C.

The polybutadiene produced was determined to have a glass transition temperature (Tg) at −90° C. and a sharp melting peak at 35° C. It was then determined to have a microstructure which contained 3.0 percent 1,2-polybutadiene units, 13.0 percent cis-1,4-polybutadiene units, and 84% trans-1,4-polybutadiene units. The Mooney viscosity (ML-4) at 100° C. for this polymer was determined to be 97.

Comparative Example 75

The procedure described in Example 74 was utilized in this example except that the three catalyst components, as described in the prior, namely Ba(DEGEE), TOA and n-BuLi, were used as the catalyst (see EP 1018521 A1 and U.S. Pat. No. 4,996,273). These three components were added directly to the reactor containing 1,3-butadiene in hexane premix at 90° C. The molar ratio of Ba(DEGEE) to TOA and to n-BuLi was 1:4:3. The GC analysis of the residual monomer contained in the polymerization mixture indicated that the monomer conversions at 60 and 90 minutes were 90% and 96%, respectively. The resulting polymer has a Tg at −90° C. and broad melting peaks at 22° C. and 35° C. It was also determined to have a microstructure, which contained 3.6% 1,2-polybutadiene units, 16.1% cis-1,4-polybutadiene units, and 80.3% trans-1,4-polybutadiene units. The Mooney viscosity (ML-4) of the polymer was determined to be 37.

Comparative Example 76

The procedure described in Example 74 was utilized in this example except that the pre-reacted barium catalyst was made without pyrrolidine. The molar ratio of BaDEGEE to TOA and to n-BuLi was 1:4:3. GC analysis of the residual monomer contained in the polymerization mixture indicated that the monomer conversions at 60 minutes and 90 minutes were 89% and 96%, respectively. The resulting polymer had a Tg at −90° C. and broad melting peaks at 20 and 36° C. It was also determined to have a microstructure, which contained 3.3% 1,2-polybutadiene units, 15.8% cis-1,4-polybutadiene units, and 80.7% trans-1,4-polybutadiene units. The Mooney (ML-4) viscosity of the polymer was determined to be 68.

Examples 77–79

The procedure described in Example 74 was utilized in this example except that the order of addition of the four catalyst component was altered. The monomer conversions, melting points, Mooney ML-4 siscosities, and microstructures of the resulting polymers are listed in the following table.

| Example No | Order of Addition (Catalyst Components) | Rate (% conv) 60 min. | Rate (% conv) 90 min. | Tg (C.) | Tm (C.) | ML-4 | Trans-1,4 (%) |
|---|---|---|---|---|---|---|---|
| 77 | BaDEGEE, Pyrrolidine, TOA, n-BuLi | 83% | 91% | −90 | 35 | 97 | 84 |
| 78 | BaDEGEE, TOA, Pyrrolidine, n-BuLi | 78% | 90% | −90 | 36 | 83 | 84 |
| 79 | BaDEGEE, TOA, n-BuLi, Pyrrolidine | 61% | 89% | −90 | 36 | 82 | 84 |

While certain representative embodiments and details have been shown for the purpose of illustrating the subject invention, it will be apparent to those skilled in this art that various changes and modifications can be made without departing from the scope of the present invention.

What is claimed is:

1. A process for synthesizing rubbery polymers having a high trans microstructure by a process that comprises polymerizing a conjugated diolefin monomer in an organic solvent at a temperature that is within the range of about 40° C. to about 120° C. in the presence of a catalyst system that is comprised of (a) an organolithium compound, (b) a group IIa metal salt of an amino glycol, and (c) an organometallic compound selected from the group consisting of organoaluminum compounds containing less than 13 carbon atoms and organomagnesium compounds.

2. A process as specified in claim 1 which further comprises copolymerizing styrene with the conjugated diolefin monomer.

3. A process as specified in claim 2 wherein the rubbery polymer having a high trans content is trans-styrene-butadiene fiber and wherein the conjugated diolefin monomer is 1,3-butadiene.

4. A process as specified in claim 2 wherein the rubbery polymer having a high trans content is trans-styrene-isoprene rubber and wherein the conjugated diolefin monomer is isoprene.

5. A process as specified in claim 2 wherein the rubbery polymer having a high trans content is trans-styrene-isoprene-butadiene rubber and wherein the conjugated diolefin monomer is a mixture of isoprene monomer and 1,3-butadiene monomer.

6. A process as specified in claim 1 wherein the organolithium compound is an organomonolithium compound.

7. A process as specified in claim 6 wherein the organoaluminum compound is of the structural formula:

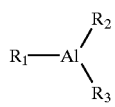

wherein $R_1$ is selected from the group consisting of alkyl groups, cycloalkyl groups, aryl groups, alkaryl groups, arylalkyl groups and hydrogen atoms, and wherein $R_2$ and $R_3$ are selected from the group consisting of alkyl groups, cycloalkyl groups, aryl groups, alkaryl groups and arylalkyl groups.

8. A process as specified in claim 7 wherein $R_1$, $R_2$, and $R_3$ represent alkyl groups that contain from 1 to 8 carbon atoms.

9. A process as specified in claim 1 wherein the group IIa metal salt is of the structural formula:

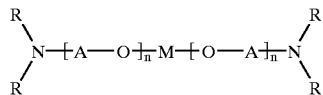

wherein the R groups can be the same or different and represent alkyl groups, cycloalkyl groups, aryl groups, alkaryl groups or arakyl groups; wherein M represents a group IIa metal selected from the group consisting of beryllium, magnesium, calcium, strontium, and barium; wherein n represents an integer from 2 to about 10; and wherein A represents an alkylene group that contains from about 1 to about 6 carbon atoms.

10. A process as specified in claim 9 wherein R represents an alkyl group that contains from about 1 to about 8 carbon atoms or a cycloalkyl group that contains from about 4 to about 8 carbon atoms; wherein n to represent an integer from about 2 to about 4; wherein A represents an alkylene group that contains from 2 to about 4 carbon atoms; and wherein M represents a member selected from the group consisting of strontium and barium.

11. A process as specified in claim 9 wherein R represents an alkyl group that contains from about 1 to about 4 carbon atoms; wherein A represents an ethylene group; and wherein M represents barium.

12. A process as specified in claim 1 wherein the group IIa metal salt is of the structural formula:

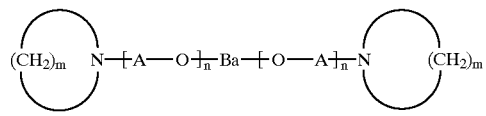

wherein m represents an integer from 4 to about 8; wherein n represents an integer from 2 to about 10; wherein M represents a group IIa metal selected from the group consisting of beryllium, magnesium, calcium, strontium, and barium; and wherein A represents an alkylene group that contains from about 1 to about 6 carbon atoms.

13. A process as specified in claim 12 wherein m to represents an integer from 5 to about 7, wherein n represents an integer from about 2 to about 4, wherein A represents an alkylene group that contains from 2 to about 4 carbon atoms, and wherein M represents a metal selected from the group consisting of strontium and barium.

14. A process as specified in claim 13 wherein A represents ethylene groups, and wherein M represents barium.

15. A process as specified in claim 9 wherein the molar ratio of the organoaluminum compound to the group IIa metal salt is within the range of about 0.5:1 to about 15:1; and wherein the molar ratio of the organolithium compound to the group IIa metal salt is within the range of about 0.5:1 to about 15:1.

16. A process as specified in claim 12 wherein the molar ratio of the organoaluminum compound to the group IIa metal salt is within the range of about 0.5:1 to about 15:1; and wherein the molar ratio of the organolithium compound to the group IIa metal salt is within the range of about 0.5:1 to about 15:1.

17. A process as specified in claim 9 wherein the molar ratio of the organoaluminum compound to the group IIa metal salt is within the range of about 1:1 to about 8:1; and wherein the molar ratio of the organolithium compound to the group IIa metal salt is within the range of about 1:1 to about 6:1.

18. A process as specified in claim 1 wherein the organometallic compound is an organomagnesium compound.

19. A process as specified in claim 18 wherein the group IIa metal is beryllium.

20. A process as specified in claim 18 wherein the group IIa metal is magnesium.

* * * * *